(12) United States Patent
Weaver

(10) Patent No.: US 10,940,454 B2
(45) Date of Patent: Mar. 9, 2021

(54) BIOCHAR METHODS, SYSTEMS, DEVICES, AND PRODUCTS

(71) Applicant: Proton Power, Inc., Lenoir City, TN (US)

(72) Inventor: Samuel C. Weaver, Knoxville, TN (US)

(73) Assignee: Proton Power, Inc., Lenoir City, TN (US)

( * ) Notice: Subject to any disclaimer, the term of this patent is extended or adjusted under 35 U.S.C. 154(b) by 0 days.

(21) Appl. No.: 15/873,052

(22) Filed: Jan. 17, 2018

(65) Prior Publication Data

US 2018/0280906 A1    Oct. 4, 2018

Related U.S. Application Data

(60) Provisional application No. 62/447,100, filed on Jan. 17, 2017.

(51) Int. Cl.
*B01J 2/28* (2006.01)
*B01J 2/00* (2006.01)
(Continued)

(52) U.S. Cl.
CPC .............. *B01J 2/006* (2013.01); *A23K 10/30* (2016.05); *A23K 20/10* (2016.05); *A23K 50/10* (2016.05);
(Continued)

(58) Field of Classification Search
CPC .. B01J 28/006; B01J 20/3021; B01J 20/3028; B01J 20/3078; B01J 20/20;
(Continued)

(56) References Cited

U.S. PATENT DOCUMENTS

| | | |
|---|---|---|
| 2012/0168297 A1 | 7/2012 | Burnett |
| 2015/0144564 A1* | 5/2015 | Moller ................. C02F 9/00 |
| | | 210/662 |

(Continued)

FOREIGN PATENT DOCUMENTS

| | | | | |
|---|---|---|---|---|
| CN | 103551116 A | * | 2/2017 | ............ B01J 20/22 |
| GB | 1422105 A | * | 1/1976 | ............ B02C 19/06 |

OTHER PUBLICATIONS

Ries, Tim et al. "Permies.com" <https://permies.com/t/28834/Advice-Crushing-Biochar> pp. 1-11 (2014).*

(Continued)

*Primary Examiner* — Jennifer A Smith
(74) *Attorney, Agent, or Firm* — Wilson Patent Law, LLC

(57) ABSTRACT

Tools and techniques for biochar method, systems, devices, and products are provided in accordance with various embodiments. For example, methods are provided in accordance with various embodiments that may include rubbing one or more objects with biochar. Rubbing the one or more objects with biochar may include: polishing one or more objects utilizing biochar; cleaning one or more objects utilizing biochar; grinding one or more objects utilizing biochar; scratching one or more objects utilizing biochar; and/or abrading one or more objects utilizing biochar. In some embodiments, polishing the one or more objects utilizing the biochar includes: combining water, the biochar, and the one or more objects; and/or tumbling the combined water, biochar, and one or more objects. The one or more objects may include one or more stones. The tumbling may occur for 72 hours or less. The tumbling may occur as a single step.

6 Claims, 27 Drawing Sheets

(51) Int. Cl.
- *B01J 20/30* (2006.01)
- *A23K 20/10* (2016.01)
- *B01J 20/20* (2006.01)
- *A23K 10/30* (2016.01)
- *C05F 11/02* (2006.01)
- *A23K 50/10* (2016.01)
- *C05F 17/10* (2020.01)
- *C05G 3/80* (2020.01)
- *C05G 5/12* (2020.01)

(52) U.S. Cl.
CPC .............. *B01J 2/28* (2013.01); *B01J 20/20* (2013.01); *B01J 20/3007* (2013.01); *B01J 20/3021* (2013.01); *B01J 20/3028* (2013.01); *B01J 20/3078* (2013.01); *C05F 11/02* (2013.01); *C05F 17/10* (2020.01); *C05G 3/80* (2020.02); *C05G 5/12* (2020.02); *Y02P 20/145* (2015.11); *Y02W 30/40* (2015.05)

(58) Field of Classification Search
CPC ......... B01J 20/3007; B01J 2/28; A23K 50/10; A23K 10/30; A23K 20/10; C05F 11/02; C05F 17/0045; C05G 3/04; C05G 3/0058; Y02W 30/43; Y02P 20/145
See application file for complete search history.

(56) References Cited

U.S. PATENT DOCUMENTS

| | | | |
|---|---|---|---|
| 2016/0030922 | A1 | 2/2016 | Eddy |
| 2016/0046536 | A1* | 2/2016 | Haug .................. C06B 23/001 149/2 |
| 2016/0220014 | A1* | 8/2016 | Sprosta ............. A46B 15/0093 |
| 2017/0022117 | A1* | 1/2017 | Traxler .................... A01C 1/06 |

OTHER PUBLICATIONS

Youtube: TheCrazyCruzher. "CrazyCrusher the Manually operated rock crusher!." YouTube, <https://www.youtube.com/watch?v=o9h9WoGIIYU> Sep. 20, 2010.*

Info. "Crazy Crusher". Goldquest, LLC <http://www.crazycrusher.com/info.html> Oct. 13, 2016.*

* cited by examiner 101-d

BIOCHAR METHODS, SYSTEMS, DEVICES, AND PRODUCTS

CROSS-REFERENCES TO RELATED APPLICATIONS

This application is a non-provisional patent application claiming priority benefit of U.S. provisional patent application Ser. No. 62/447,100, filed on Jan. 17, 2017 and entitled "BIOCHAR METHODS, SYSTEMS, DEVICES, AND PRODUCTS," the entire disclosure of which is herein incorporated by reference for all purposes.

BACKGROUND

Carbon may be considered a key building block of life. It may be useful in many different ways and in many different forms. Because of the wide variety of applications and uses of carbon, it generally has economic value that also varies widely.

For example, carbon in the form of biochar may be utilized for a variety of purposes. While there are different known techniques for producing biochar with a variety of different characteristics, there may be a general need for additional methods for utilizing carbon compounds, such as biochar, with different characteristics.

BRIEF SUMMARY

Tools and techniques for biochar methods, system, devices, and products are provided in accordance with various embodiments.

For example, methods are provided in accordance with various embodiments that may include rubbing one or more objects with biochar. For example, rubbing the one or more objects with biochar may include: polishing the one or more objects utilizing biochar; cleaning the one or more objects utilizing biochar; grinding the one or more objects utilizing biochar; scratching the one or more objects utilizing biochar; and/or abrading the one or more objects utilizing biochar.

In some embodiments, polishing the one or more objects utilizing the biochar includes: combining water, the biochar, and the one or more objects; and/or tumbling the combined water, biochar, and one or more objects. The one or more objects may include one or more stones. The tumbling may occur for 72 hours or less. The tumbling may occur as a single step.

In some embodiments, polishing the one or more objects utilizing the biochar includes: positioning the biochar between a first surface of a first object from the one or more objects and a first surface of a second object from the one or more objects; and/or lapping the first surface of the first object and the first surface of the second object utilizing the biochar positioned between the first surface of the first object and the first surface of the second object.

In some embodiments, the biochar includes graphene. In some embodiments, the biochar includes graphene-like characteristics. In some embodiments, the biochar includes graphite.

Some embodiments include: separating the biochar from the one or more objects after utilizing the biochar; and/or applying the separated biochar to a soil.

Some embodiments include modifying a size of the biochar before rubbing the one or more objects with the biochar. Modifying the size of the biochar may form a uniform size of the biochar. Modifying the size of the biochar may include grinding the biochar utilizing a ball mill.

Some embodiments include combining biochar with a 3D printing material. The 3D printing material may include plastic.

Some embodiments include producing the biochar. Producing the biochar may include: introducing a compound that includes at least carbon, oxygen, and hydrogen into a reaction chamber; heating the compound to a temperature of at least 1,000 degrees Celsius in the reaction chamber such that the compound reacts through a pyrolysis reaction to produce biochar; and/or collecting the produced biochar.

In some embodiments, the temperature is at least 1,100 degrees Celsius. In some embodiments, the compound has a residence time in the reaction chamber between 10 seconds and 1,000 seconds to produce the biochar. The compound may have a residence time in the reaction chamber of 300 seconds or less to produce the biochar. The compound may have a residence time in the reaction chamber of 120 seconds or less to produce the biochar. In some embodiments, the pyrolysis reaction includes a hydrous pyrolysis reaction.

In some embodiments, the biochar includes: a carbon component produced from at least biomass or a waste stream, wherein the carbon component includes at least graphite or graphene; a hydrogen component; and/or one or more mineral components originating from at least the biomass or the waste stream. The biochar may have a surface area of at least 300 $m^2/g$. The biochar may have a surface area of at least 360 m2/g. The biochar may have a water holding capacity of at least 80% of a weight of the biochar. The biochar may have a fixed volatile content less than or equal to 2% of the biochar product. The biochar may have a pH between 10 and 11.

Some embodiments include modifying a size of the biochar before utilizing the biochar with respect to at least the polishing one or more objects utilizing biochar, cleaning one or more objects utilizing biochar, grinding one or more objects utilizing biochar, scratching one or more objects utilizing biochar, or abrading one or more objects utilizing biochar. Modifying the size of the biochar may result in a uniform size of the biochar.

Some embodiments include methods, systems, products, and/or devices as described in the detailed description and/or shown in the figures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
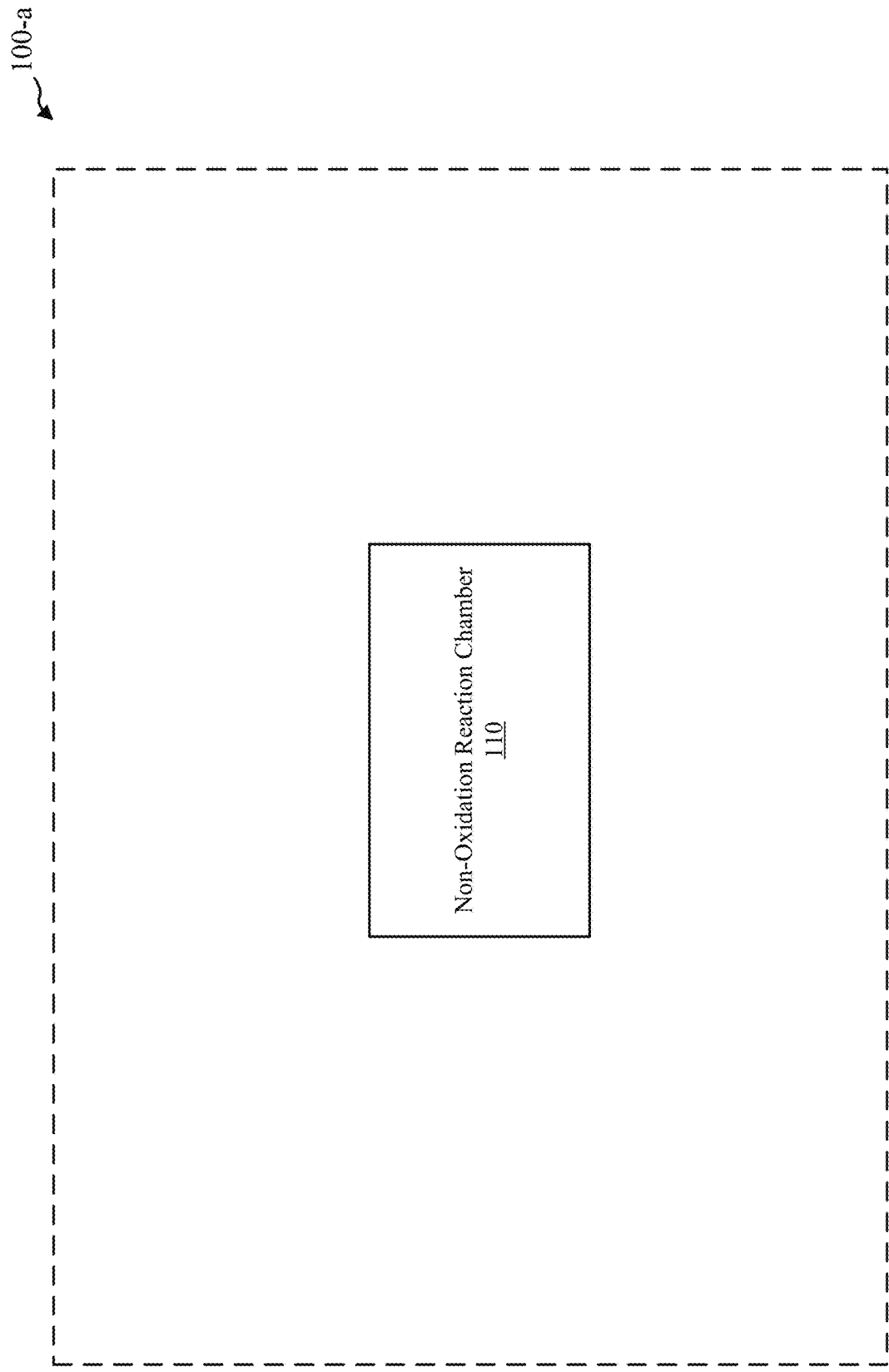
FIG. 1A shows a biochar production system in accordance with various embodiments.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment, as other embodiments may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which may be depicted as a flowchart, a flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Some embodiments are provided that may include different biochar products with various characteristics along with tools and techniques for producing biochar and/or utilizing biochar. Embodiments in general may utilize a non-oxidation process, such as pyrolysis, that may produce a gases or liquids and that may be used to make different end products such as synfuels, electricity, and/or hydrogen. For example, pyrolysis may generally involve the process of thermally decomposing organic matter (such as biomass or other compounds that include carbon, oxygen, and hydrogen) in a limited oxygen environment or without the use of oxygen as a separate compound in the reaction. Pyrolysis may include the process of breaking down biomass using heat in the absence of oxygen in some cases. The breakdown of the biomass may release gases, and the remaining solid may include a carbon-rich substance commonly that may generally be known as biochar or pyrolytic carbon. The constituency and characteristics of the biochar may vary with the feedstock and the mechanical and thermal processes that are employed to accomplish pyrolysis.

The term biochar may generally refer to different carbon compounds that may be made utilizing a non-oxidation process or that may have different characteristics. Biochar may also be referred to in some cases as carbon char, pyrolytic carbon, and/or black carbon.

One of the characteristics of biochar in accordance with various embodiments that may be of significance for its quality and value may be the total amount of fixed carbon contained in the biochar. Fixed carbon is generally a very stable form of carbon that may be resistant to decomposition and may stay in soils for thousands of years as opposed to volatile organic compounds (VOCs), which generally evaporate or sublimate quickly into the atmosphere at ambient temperatures. References to "carbon" herein may refer to fixed carbon.

Some embodiments may include biochar with specific electrical properties. Some embodiments, for example, may utilize a high pyrolysis temperature that may impact the relative amounts of the carbonaceous phases in pyrolytic carbons (amorphous carbon, composite carbons containing both amorphous carbon and turbostratic crystallites, and/or graphite). This may in turn impact the bulk electrical properties of the material. In some cases, the electrical conductivity of the carbon char may be increased several orders of magnitude as the pyrolysis temperature increases. Higher temperatures, such as temperatures of at least 1,000 degrees Celsius or at least 1,100 degrees Celsius, in accordance with various embodiments may increase the electrical conductivity.

The term biochar may often be most closely associated with its use as a soil amendment, and its value as such may be affected among other things by the amount of carbon that it contains. Biochar may be a very stable soil amendment due to the carbon, and some of the most fertile soils in the world may have a high content carbon that comes from biochar being added to the soil. For example, the rich soil in the corn belt of the U.S. Great Plains may be the result of over 10,000 years of prairie fires that created biochar that mixed into the soil. While biochar may be utilized as a soil amendment, it has other application as discussed herein.

The carbon produced in the creation of biochar may be different from other forms of carbon in that it may have reached a certain level of activation. Activation generally means that the carbon has small pores on its surface that may create more surface area available for adsorption (i.e., the adhesion of atoms, ions, or molecules to a surface) and for chemical reactions to take place. Activation level is often measured in $m^2/g$, and typical biochar activation levels range from 30 $m^2/g$ to 50 $m^2/g$, though other ranges may be applicable.

In some cases, the pyrolysis process may tend to concentrate the nutrients of the biomass into the biochar, so the biochar's capability as a fertilizer may be enhanced. When used as a soil amendment, higher amounts of carbon and higher activation levels of the biochar may cause the following benefits: increases soil water holding capacity, which may be referred to as Field Capacity—less water may be needed (with higher field capacity, the frequency and/or duration of irrigation may be reduced); increases soil aeration; improves fertilizer efficiency—less fertilizer may be needed; acts as a liming agent or to raise the pH of acidic soils; improves cation exchange capacity; improves nitrogen cycle reactions: ammonification, nitrification; and/or improves drought tolerance.

Carbon with very high activation levels (500 $m^2/g$-2000 $m^2/g$), commonly known as activated carbon or active carbon, may have even more applications and is, therefore, may be more valuable. There may be over 150 applications of activated carbon in wide-ranging areas such as filtration and/or purification of liquids, gases, and chemicals, mercury removal in power plants, medical uses, and environmental applications. The World Health Organization (WHO) includes activated carbon in its list of essential medicines, that is, "those drugs that that satisfy the health care needs of the majority of the population; they should therefore be available at all times in adequate amounts and in appropriate dosage forms, at a price the community can afford."

As previously mentioned, the carbon produced in a pyrolysis process may be dependent primarily on the biomass (incoming moisture content, particles size distribution, bulk and/or particle density, heating value, ash content, cell structure, turgor pressure, harvesting method, age since harvest, type of death, storage method, etc.) or other COH feedstock, the mechanical process employed, and the temperature at which the pyrolysis occurs. Some embodiments include produced biochar that indicate that it may have higher quality and higher performance than traditional biochars; this may be due in part to the different mechanical systems and operating temperatures, residences, and/or pressures that may be utilized in different embodiments.

Some embodiments may utilize a fast pyrolysis process to produce biochar along with synthetic gas in some cases, which may be used in the production of synfuels, electricity, and/or hydrogen for example. The biochar and synthetic gas may be referred to as co-products in some cases.

In some embodiments, a COH compound, such as biomass, may be transported to a reaction or heating chamber by an auger. The reaction chamber may be configured as a tube in some cases. The reaction chamber may be heated to cause a non-oxidation reaction such as a pyrolysis reaction. This auger-based approach combined with temperature controls that may maintain a constant and/or controlled temperature over the length of the reaction chamber may help ensure that the COH compound, such as biomass, may consistently flows through the reaction or heating chamber. This may help achieve a consistent residence time and/or consistent heat transfer to the COH compound. This may mean that all or most of the COH compound may receive an equal opportunity for the full conversion process to happen; this may result in a higher yield of fixed carbon, less ash, greater transfer of nutrients, etc. to the biochar produced. Other pyrolysis systems may employ a fluidized bed transport process through the reaction chamber, which may inherently cause residence time and/or heat transfer to be inconsistent.

Some embodiments may operate at temperatures of at least 1,000 degrees Celsius or at least 1,100 degrees Celsius, which may be much higher than most other pyrolysis systems for biochar that may typically operate in the 400-700 degrees Celsius range. These high temperatures may improve some of the characteristics of the produced biochar. Some embodiments may include producing biochar via a non-oxidation or pyrolysis process without the use of any other additives (e.g., vinegar) or processes.

The COH compound may have a residence time a reaction chamber between 10 seconds and 1,000 seconds to produce the biochar in some embodiments. Some embodiments may utilize residence time in a reaction chamber of less than 300 seconds and some embodiments may have a residence time of less than 120 seconds. Some embodiments may have a residence time greater than 30 seconds or greater than 60 seconds. For example, the following ranges may be applicable to different embodiments: 10 seconds to 1,000 seconds, 10 seconds to 300 seconds, 10 seconds to 120 seconds; 30 seconds 1,000 seconds, 30 seconds to 300 seconds, 30 seconds to 120 seconds; 60 seconds to 1,000 seconds, 60 seconds to 300 seconds, or 60 seconds to 120 seconds. These residences times may be significant different than other residences times for biochar systems or methods that often may utilize residence times measured in hours or days.

The different biochar systems, devices, methods, and products described in accordance with various embodiments may have a variety of benefit and differences from other biochar tools, techniques, and/or products. For example, biochar produced in accordance with various embodiments may be manufactured at a higher temperature than other biochars. As a result, it may have properties for a number of applications that may differ from other biochars.

For example, some embodiments may be characteristics such as being stable (1-2% volatiles), may have a high surface area (for example, greater than 360 square meters/gm, 366 square meters/gram in one example), may recover the minerals the COH compound took out of ground, and/or may have a pH of 10-11. Other embodiments may have other values for these characteristics that may differ from other biochar.

The amount of biochar produced may vary based on one or more products produced by the different systems in accordance with various embodiments. For example, when producing synfuel as a primary product, carbon may be produced at a rate between 10%-15% of the mass of COH compound, such as biomass, entering the system (measured on a dry basis). Other ranges may be produced. Merely by way of example, for systems that may produce electricity or hydrogen, the biochar production may be in the 4%-10% range. Other ranges may be produced.

In some embodiments, the surface area may be important in different embodiments for a variety of reasons including, but not limited to, promoting transfer of nutrients between plant and soil, providing sites for composting activity to occur, retaining water for plants in dry climates or soils, providing sites for filtration activity to occur, and/or aerating soil by providing open areas. One or more of these attributes may lead to substantially improved plant growth and/or productivity; these one or more attributes may also decrease the amount of fertilizer that may be required in some situations.

Some embodiments may include improved water holding capacity. For example, a capability of some biochar in accordance with various embodiments may include the ability to retain large amounts of water. This may be important to provide water to plants in dry climates, for good composting, and/or to promote good nutrient flow between a plant and the soil, for example.

In some embodiments, the produced char in accordance with various embodiments may hold approximately 173 gallons per ton of carbon, or between 170 and 180 gallons per ton. That may mean that every 10 pounds of produced biochar may retain over 7 pounds of water. Other ranges of water hold capacity may be achieved by some embodiments.

The following table, provided merely by way of example, may provide information regarding as received moisture content, moisture holding capacity, and/or bulk density of different biochars, soil, and/or organic potting mixes with respect to some embodiments and other known products. Table 1 below provides examples of received moisture content, moisture holding capacity, and bulk density of different biochars, soil, and organic potting mix. The second and third listed examples of biochar are provided in accordance with various embodiments.

TABLE 1

As received moisture content, moisture holding capacity and bulk density of different biochars, soil, and organic potting mix.

| Sample | As Received Moisture Content (%) | Saturated Moisture Content (%) | Water Holding Capacity (cc/100 cc) | Water Holding Capacity (gal/ton) | Bulk Density (g/100 cc) | Bulk Density (lb/ft$^3$) |
|---|---|---|---|---|---|---|
| Example A | 55 | 72 | 45.9 | 172 | 17.8 | 11.1 |
| An Embodiment with Switchgrass Biochar | 8 | 86 | 51 | 206 | 8.3 | 5.2 |
| An Embodiment with Hardwood Biochar | 11 | 82 | 51.8 | 196 | 11.5 | 7.2 |
| Example B | 5 | 71 | 30.4 | 170 | 12.5 | 7.8 |
| Example C | 5 | 59 | 59.5 | 141 | 42.9 | 26.7 |
| Soil Sample | 9 | 19 | 38.5 | 45 | 161.3 | 100.5 |
| Example D | 18 | 34 | 25.3 | 81 | 48.1 | 29.9 |
| Example E | 45 | 69 | 40.7 | 165 | 18.2 | 11.3 |
| Organic Potting Mix Sample | 53 | 72 | 41.3 | 172 | 15.5 | 9.6 |

Some embodiments may produce biochar that may be different and may be superior to biochar produced by other processes, such as other pyrolysis processes. For example, some embodiments may have improved surface area or activation. Some embodiments may, for example, have a measure of the activation level of the carbon that is over 300 m$^2$/g. Some embodiments may include a range of activation levels over 360 m$^2$/g, though other values may be applicable. In one embodiment, the activation level is approximately 366 m$^2$/g.

Some embodiments may include produced biochar that may have an improved total fixed carbon. In general, the more carbon there may be, the better the biochar may be, because it is the carbon that may determine some of its beneficial characteristics. In some embodiments, the total fixed carbon in the produced biochar may be greater than 80%, such as in the range from 80%-90%, though higher values may be applicable to some embodiments. This may be based upon the type of feedstock used to produce it. Woody biomass feedstocks, for example, may tend to generate a higher amount of carbon with values that may be in excess of 85%. Other ranges of total fixed carbon may be achieved for some embodiments, such as at least 75% total fixed carbon, though other values may be achieved in some cases. Merely by way of example, the total fixed carbon in produced biochars from lower temperature pyrolysis processes (400 degrees Celsius-700 degrees Celsius) may typically be in the 70% range.

Some embodiments may have less ash content than other forms of biochar, though some embodiments may have comparable ash content to other forms of biochar. Ash is generally the waste material from a combustion process and may include mostly salty, inorganic constituents when biomass is burned. It may be undesirable in biochar, because its presence may indicate that combustion has taken place, which may generally not be good in a pyrolysis process, and that production of fixed carbon may not been optimized. Some embodiments may have an ash content less than 10%; for example, some embodiments may have an ash content between 5%-10%.

Some embodiments may have less volatile organic compounds (VOCs) than other biochars. VOCS that may evaporate or sublimate quickly into the atmosphere at ambient temperatures, for example, may be undesirable components of biochar. This may be because they may carry carbon back into the atmosphere instead of fixing it in the soil, and they may actually be harmful materials. Some embodiments may have VOC levels less than 10% or 15%. For example, some embodiments may have 5%-10% volatiles. Other known biochars may typically have 20%-30% volatiles.

Some embodiments may include biochars that include no dioxins and/or furans, or may be at least at levels below detectable limits. This may eliminate the concerns regarding dioxins and/or furans. For example, the presence of such toxins may limit the range of applications for which the biochar can be used; use of biochars laden with dioxins or furans as a soil supplement for feed crops or animal or livestock feed supplement may be disallowed. Some embodiments may thus avoid these problems having levels of dioxins and/or furans that may be below detectable limits.

Some embodiments may have pH levels of the biochar greater than 8.5. The pH level of biochar may generally play a role in its functionality as a soil amendment and as a potential animal or livestock feed supplement. Some embodiments have produced biochar of approximately 8.5-9.5, so it is slightly basic; this may be a good characteristic when used as a soil amendment in acidic soils. Some embodiments may have biochar with a pH greater than 8 and/or other ranges. For example, some embodiments have a pH between 10 and 11.

Embodiments may have a wide variety of applications. The following provides different examples, though other applications may be found for the produced biochars in accordance with various embodiments.

Some embodiments may be applicable to soil enhancement. For example, some embodiments may include produced biochar that may be well suited for the home garden or consumer retail market for both ornamental plants and food-producing plants. In some cases, the produced biochar may be more effective if it is mixed into the soil versus as a topical treatment. Some application techniques may be more effective if the produced biochar is tilled the soil prior to or during planting. In some cases, produced biochar in accordance with various embodiments may achieve equivalent or better chemical and physical characteristics to other known biochar without the need for any post-processing. The following tables provide comparison between an example biochar with a biochar produced in accordance with various embodiments. Other known biochars and other biochars produced in accordance with various embodiments may have different values.

TABLE 2

Proximate analysis (dry basis)

| | % Moisture | % Fixed carbon |
|---|---|---|
| Example Biochar | 4.15 | 71.4 |
| Biochar in accordance with various embodiments | 1.23 | 79.97 |

Volatile matters and ash contents were generally performed as dry basis generally according to the ASTM requirements.

TABLE 3

Ultimate analysis (dry basis)

| | % C | % H | % N | Heating value (MJ/Kg) |
|---|---|---|---|---|
| Example Biochar | 71.8 | 3.13 | 0.73 | 27.2 |
| Biochar in accordance with various embodiments | 84.01 | 0.58 | 2.42 | 30.68 |

Other non-biochar products, such as vermiculite, perlite, potting soil, and other specialty products may not have the range of beneficial attributes that biochar produced in accordance with various embodiments may have.

Biochar produced in accordance with various embodiments may be packaged and/or presented in different ways, including configured in different changes. Some embodiments may configure the biochar as small cubes that may fit in a hole in the soil for each plant. In some cases, a container for a plant or several plants may be made from the produced biochar. In some cases, the produced biochar may be molded in the shape of the flower pot or plant container.

These applications may also be relevant for nurseries and greenhouse uses. In some cases, biochar produced in accordance with various embodiments may be configured for mixing with soil prior to planting. In some cases, produced biochar may be package through densification, which may reduce shipping costs. In some cases, produced biochar may be configured as bricks and/or slabs, which may also provide for more efficient shipping and handling.

The tools and techniques for biochar production and biochar products in accordance with various embodiments may provide a variety of benefits when used as a soil supplement. For example, these tools and techniques may provide for significant reduction in carbon emissions; the full greenhouse gas reduction for utilizing biochar may be even more significant.

For example, the biochar produced in accordance with various embodiments may be sequestered. By sequestering the biochar as a soil supplement, for example, the different systems and/or devices provided may be carbon negative. Consequently, $CO_2$ in the air may be reduced by sequestering the carbon in the ground where may generally stay and enrich the soil for centuries and further by the enhanced growth of the plants. Merely by way of example, if the biochar in accordance with various embodiments may be sequestered in the soil, there may be a 97% reduction in $CO_2$ emissions relative to fossil diesel.

Sequestering the biochar, produced in accordance with various embodiments, in the soil may hold the carbon out of the atmosphere for centuries, even millennia. The act of putting it in the soil generally may stimulate plant growth significantly, taking even more carbon out of the air. The effect may vary by plant species and soil.

Figure 3A:
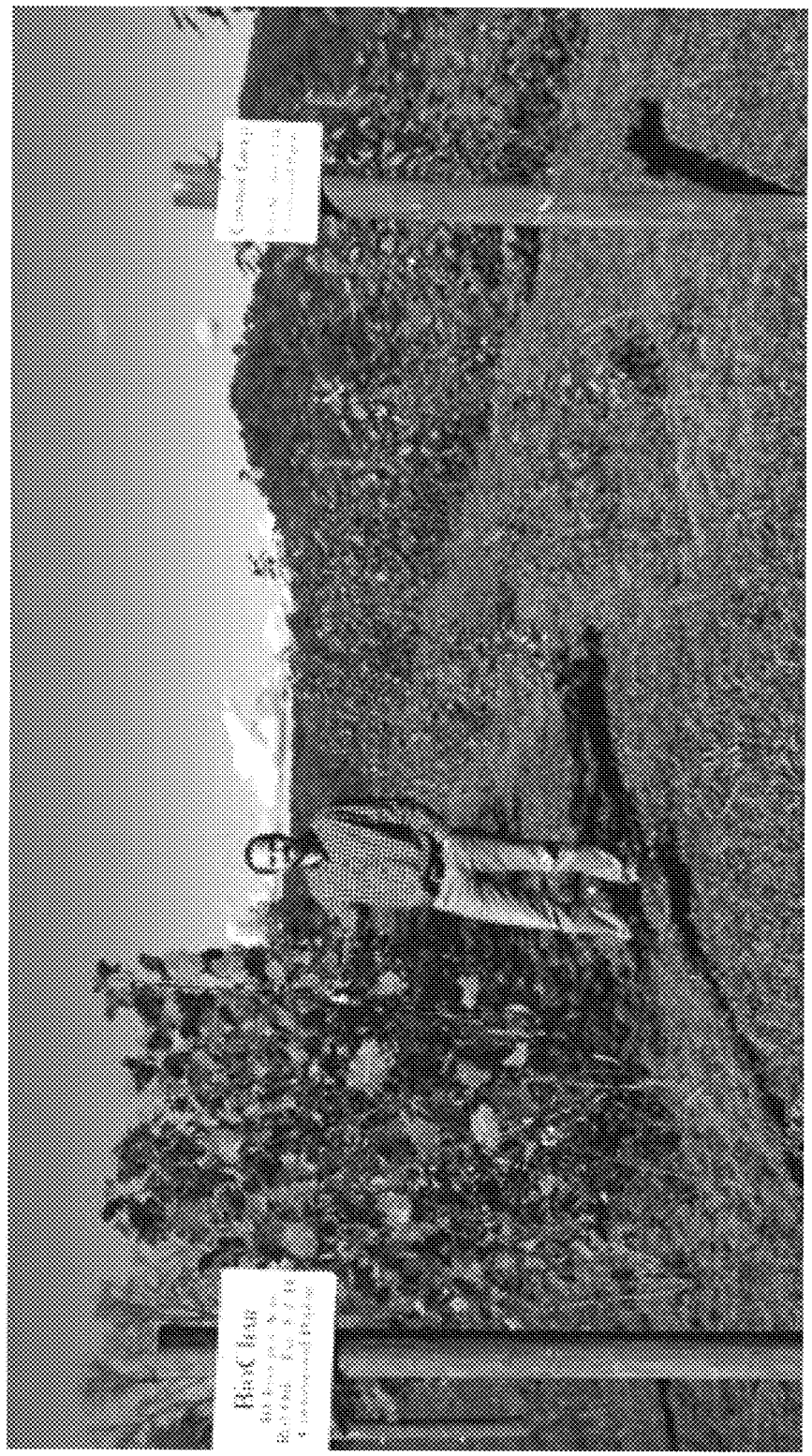
FIG. 3A shows a photograph in accordance with various embodiments.

Different test plots with a combination of red oak and poplar trees have been conducted. The photo 300 in FIG. 3A may show qualitatively the difference in tree growth after approximately 6 months. The row in the middle is the control group which received no biochar. The row to the right received biochar produced in accordance with various embodiments at an application rate of 10 tons/acre, and the row on the left received biochar produced in accordance with various embodiments at a rate of 40 tons/acre.

In some cases, the increase of total biomass yield of the poplar trees may be 400%-800% with the use of biochar in accordance with various embodiments. To put that in perspective, increases in (food) crop yield using nitrogen-based fertilizers may be typically below 100%. Moreover, the bark of the trees in the test plot actually may have spots on the bark of the trees where photosynthesis may be taking place, thereby pulling more nitrogen out of the air for the plant to use and taking more than normal amounts of $CO_2$ out of the atmosphere. Merely by way of example, Table 4 shows plant yield test results in accordance with embodiments. Other embodiments may lead to different results.

TABLE 4

Plant Yield Test Results

| Tons/ac Biochar | Stem radius - inches | Stem height - inches | Stem volume - $in^3$ |
| --- | --- | --- | --- |
| 0 | 0.28 | 26 | 2.13 |
| 10 | 0.40 (+43%) | 63 (+142%) | 10.56 (+396%) |
| 40 | 0.50 (+79%) | 76 (+192%) | 19.90 (+834%) |

Additional data with respect to red oak and popular tree growth that utilized biochar in accordance with various embodiments is provided below. Data in Table 5, for example, may reflect results after 19 months from the original planting. A single average tree from each treatment was generally harvested at a height of about 12 inches from the soil. Stem height and basal diameter were measured then generally. Each tree was then generally separated into main stem, side branches and leaves which were weighed wet and sub-sampled. Sub-samples were weighed wet and placed in an oven at 100 degrees Celsius to dry for determination of moisture content. Area of ten leaves of different sizes was also measured using a 1-inch grid, then weighed wet and placed in the oven to dry. Linear regression analysis was conducted to develop the relationship between leaf weight and wet weight of leaves. The resultant equation was used to estimate total leaf area for each tree.

TABLE 5

| | Treatment (tons biochar in accordance with various embodiments/acre) | | |
| --- | --- | --- | --- |
| Measurement | 0 | 10 | 40 |
| Height | 13 ft 2 in | 15 ft 11 in | 21 ft 11in |
| Stem Diameter | 1.2 in | 2.0 in | 2.2 in |
| Primary stem wet weight | 1.5 lb | 6.0 lb | 8.5 lb |
| Side branch wet weight | 0.5 lb | 1.5 lb | 2.5 lb |
| Leaf wet weight | 1.5 lb | 2.25 lb | 4.5 lb |
| Total plant wet weight | 3.5 lb | 9.75 lb | 15.5 lb |
| Leaf area | 37 $ft^2$ | 55 $ft^2$ | 110 $ft^2$ |

Some embodiments may include produced biochar that may be beneficial to grasses used for residential lawns, golf courses, and/or athletic fields, or turfgrass in general. In some cases, the produced biochar may be applied prior to mix into the soil prior to planting or sodding a new area of grass, for example. For turfgrass, there may be benefit gained by topical application of biochar produced in accordance with various embodiments. Produced biochar may be applied in some cases when done as part of or immediately after aeration.

Some embodiments may include produced biochar configured for compost production. In some cases, the produced biochar may provide a medium for the production of compost from a wide variety of compost materials, for example.

Figure 3B:
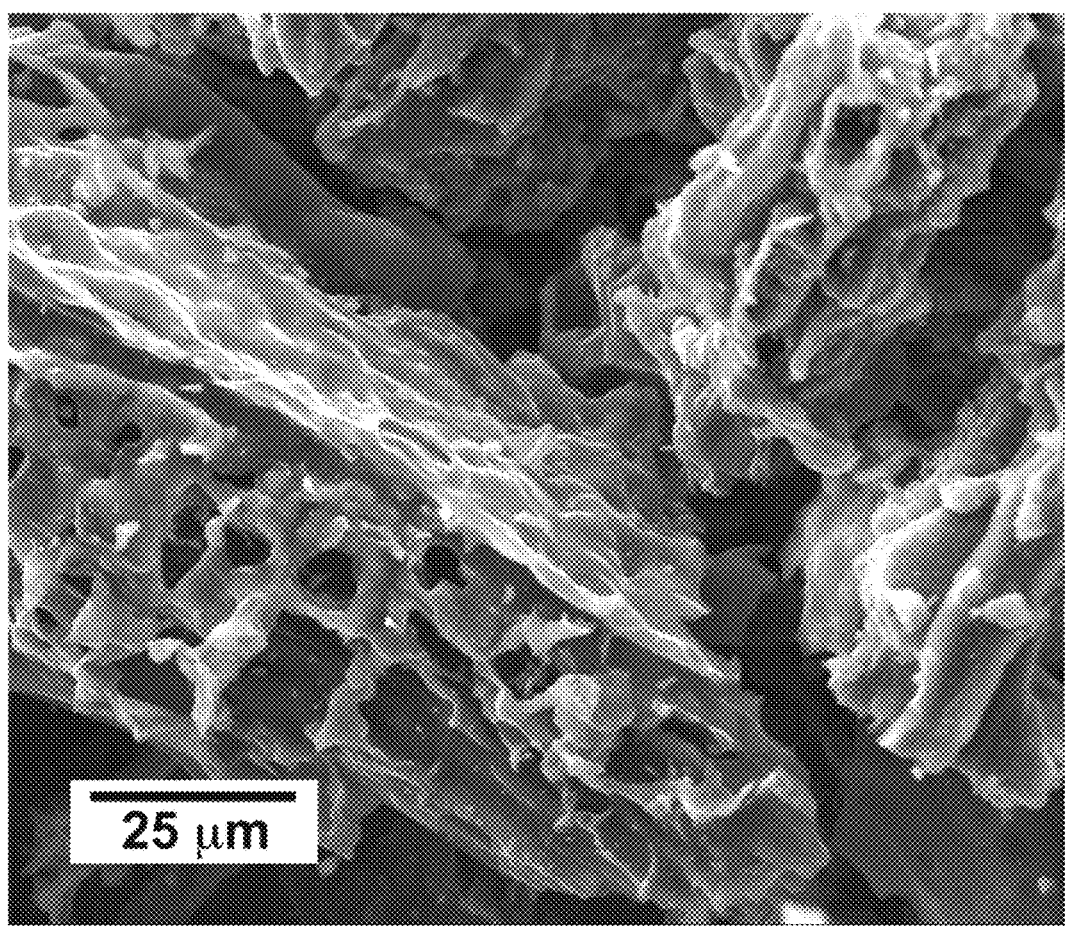
FIG. 3B shows a photograph in accordance with various embodiments.
Figure 3C:
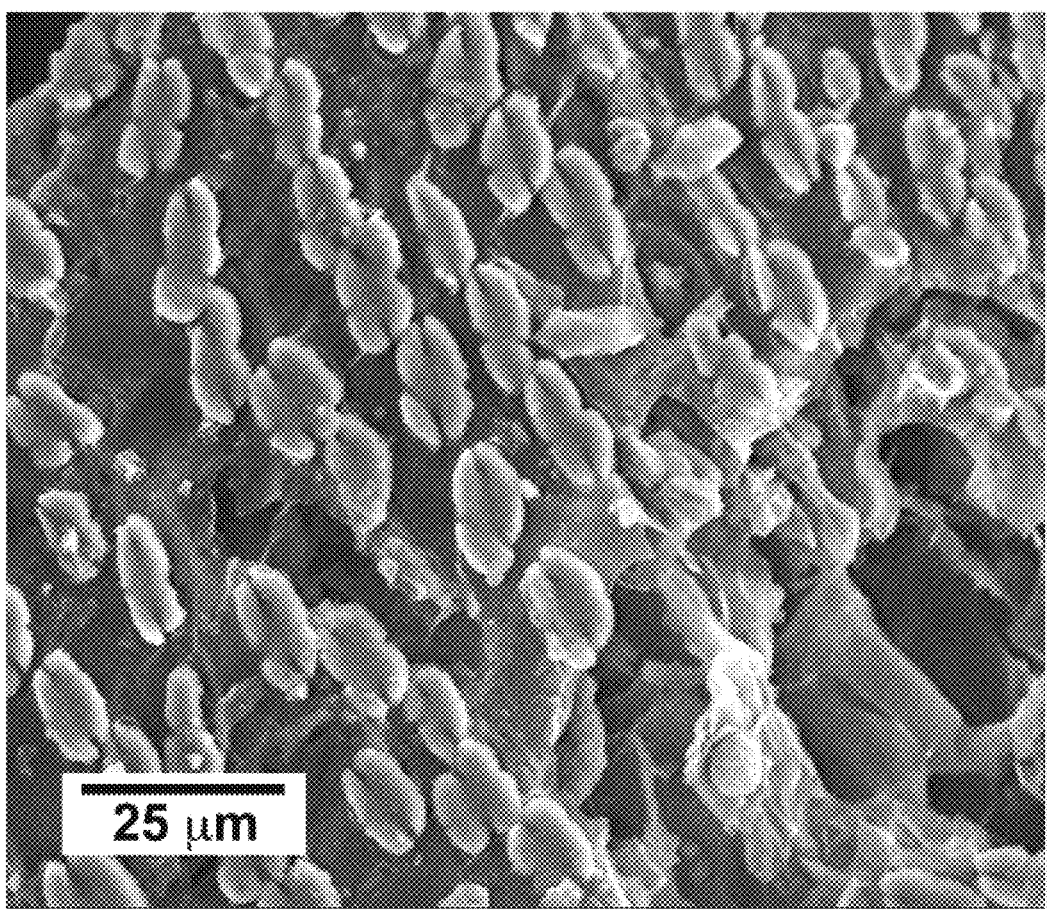
FIG. 3C shows a photograph in accordance with various embodiments.

In some cases, biochar produced in accordance with various embodiments may provide for fungal compost. In some embodiments, fungi and bacteria levels may be high, and they may be likely to stay balanced after application. In some cases, protozoa numbers may be very high, which function in the soil to mineralize nutrients including ammonium. Worms also may rely on healthy protozoa populations. Actinobacteria levels may be high in some embodiments. Actinobacteria may produce enzymes that may include volatile chemicals that may give soil its clean, fresh, earthy aroma. Photo 320 of FIG. 3B shows a scanning electron microscope image of biochar produced in accordance with various embodiments. Photo 340 of FIG. 3C shows a scanning electronic microscope image of biochar composted produced in accordance with various embodiments, which may show fungi or other components of the biochar compost.

Some embodiments of the produced biochar may be configured as animal or livestock bedding or bedding additive. Merely by way of example, poultry broiler farmers may face several problems with currently used bedding or bedding additive. The bedding or bedding additive may generate high levels of ammonia that causes unhealthy conditions for the broilers. This may lead to higher attrition rates. The bedding or bedding additive may be very smelly. The combination of these problems may require a large amount of outside air to be introduced to the broiler house, which may involve a large amount of energy to deliver. In some cases, the broilers can get foot disease caused by walking in the bedding or bedding additive. The feet of broilers may equal approximately half of the commercial value of the chicken, because chicken feet are eaten as delicacies in some parts of the world.

Some embodiments may address these types of issues. In addition, biochar produced in accordance with various embodiments and used bedding or bedding additive mix may make a good fertilizer directly, or it may be used to make compost, possibly including chickens that died during the growth cycle. In some cases, the produced biochar may be mixed with wood chips prior to spreading as animal or livestock bedding or bedding additive.

Some embodiments may include produced biochar configured as animal or livestock and/or poultry feed supplement. Charcoal has long been a remedy to give to both animals and humans when severe indigestion or poisoning occurs. There may now be studies that suggest that small amount of carbon mixed into the feed for cattle can have positive impacts. In one study, for example, biochar mixed into cattle feed at a rate of 0.5% may reduce methane emissions from the cattle by 22% and may lead to improved weight gain by 25% Adding biochar to animal or livestock feed in the US may be currently banned, because of a concern about dioxins being in the biochar. However, biochar produced in accordance with various embodiments may have undetectable dioxin levels in it, and it may be able to be categorized in a different category altogether due to its different and better properties.

Merely by way of example, for cattle, biochar produced in accordance with various embodiments may be introduced directly into the cattle feed at a prescribed rate. The approach may be the same for poultry. However, in the case of broilers, if the farmer uses biochar produced in accordance with various embodiments in the poultry bedding or bedding additive, the broiler may already have some produced biochar introduced into its system in the process of feeding.

Some embodiments may include biochar produced in accordance with various embodiments that may be configured as activated carbon. Activated carbon is generally a highly activated form of carbon with activation levels, typically may exceed 500 $m^2/g$. The high surface area and other properties of activated carbon may enable it to be used in many applications including, but not limited to, water filtration, mercury removal, pharmaceutical manufacturing, and chemical purification. As a result, activated carbon may be a useful, versatile, and expensive product.

In some embodiments, the produced biochar may have an activation level or surface area of greater than 300 $m^2/gm$. Some embodiments exceed 360 $m^2/gm$; for example, one embodiment includes a surface area of approximately 366 $m^2/gm$. In some cases, post-processing may be done to the produced biochar to convert it to activated carbon.

There may be two common methods to activate carbon: 1) physical reactivation where the source material may be developed into activated carbon using hot gases, and 2) chemical activation where the source material may be impregnated with certain chemicals, notable acids. In either of these processes, approximately two-thirds by weight of the source material may be consumed in the process and is, therefore, may not be converted to activated carbon.

While other biochars could conceivably be activated, biochar produced in accordance with various embodiments may have higher amount of total fixed carbon, low ash content, and low amount of volatile, which may make these produced biochars better candidates for activation than most.

Some embodiments include produced biochar that may be configured as asphalt modifier. Produced biochar mixed with asphalt may have different benefits, such as: the production temperature of the asphalt may be lowered; the resultant asphalt product may have greater resistance to form potholes; improved rutting resistance and/or fatigue cracking resistance; and/or anti-oxidants in the asphalt-biochar mix may cause longer pavement life.

Some embodiments may include produced biochar that may be utilized for other purposes and/or configurations, including but not limited to, carbon brakes and/or charcoal briquettes. Biochar produced in accordance with various embodiments may be formed into different shapes, such as cubes, flower pots, bricks, container shapes, and/or sheets, merely by way of example.

A general overview of a system 100-a for biochar production in accordance with various embodiments is provided with FIG. 1A. System 100-a may include a non-oxidation reaction chamber 110. The specific component(s) shown are intended merely to be illustrative. Some embodiments may include other components, not necessarily shown, that may be utilized. Some, but not all of these variants, may be noted in the description that follows.

In some embodiments, the non-oxidation reaction chamber 110 may be configured for biochar production. The non-oxidation reaction chamber 110 may be configured to heat a compound that includes at least carbon, oxygen, and hydrogen (a COH compound) to a temperature of at least 1,000 degrees Celsius such that the COH compound reacts through a non-oxidation reaction to produce biochar; in some embodiments, the non-oxidation reaction chamber 110 may be configured to heat the COH compound to at least 1,100 degrees Celsius. The produced biochar may be collected after it is produced in the non-oxidation reaction chamber 110. In some embodiments, the non-oxidation reaction includes a pyrolysis reaction. The non-oxidation reaction may include a hydrous pyrolysis reaction.

The COH compound may have a residence time in the non-oxidation reaction chamber 110 between 10 seconds and 1,000 seconds in some embodiments. Some embodiments may have a residence time in the non-oxidation reaction chamber 110 of less than 300 seconds and some embodiments may have a residence time of less than 120 seconds. Some embodiments may have a residence time greater than 30 seconds or greater than 60 seconds. For example, the following ranges of residence times in the non-oxidation reaction chamber 110 may be applicable to different embodiments: 10 seconds to 1,000 seconds, 10 seconds to 300 seconds, 10 seconds to 120 seconds, 30 seconds 1,000 seconds, 30 seconds to 300 seconds, 30 seconds to 120 seconds, 60 seconds to 1,000 seconds, 60 seconds to 300 seconds, or 60 seconds to 120 seconds.

Some embodiments that may utilize system 100-a may include augmenting or amending a soil with the produced biochar. The produced biochar may be configured as a soil enhancer. The produced biochar as the soil enhancer may include forming a biochar slurry with the produced biochar; mixing a binder with the biochar slurry to form a mixed biochar slurry; and/or molding the mixed biochar slurry into a solid form. Molding the mixed biochar slurry into the solid form may include utilizing at least a vacuum molding process or a pressure molding process. The binder may include corn starch.

Some embodiments that may utilize system 100-a include configuring the produced biochar as a compost product. Configuring the produced biochar as the compost product may include introducing at least fungi, bacteria, protozoa, or actinobacteria with the produced biochar.

Some embodiments that may utilize system 100-a include configuring the produced biochar as an animal or livestock bedding or bedding additive. Configuring the produced biochar as the animal or livestock bedding or bedding additive may include mixing the produced biochar with a biomass or other product. The biomass or other product may include wood chips, wood shavings, sawdust, rice hulls, peanut hulls, empty corn cobs, straw, hay, sand, and/or peat moss, for example. The animal or livestock bedding or bedding additive may include poultry bedding or bedding additive.

Some embodiments that may utilize system 100-a include configuring the produced biochar as a supplement for animal or livestock feed. Some embodiments include introducing the produced biochar directly into the animal or livestock feed.

Some embodiments that may utilize system 100-a include configuring the produced biochar as activated carbon. Some embodiments include configuring the produced biochar as a modifier for asphalt. Configuring the produced biochar as the asphalt modifier may include mixing the produced biochar with the asphalt, such as with respect to asphalt's bituminous binder phase. Some embodiments include configuring the produced biochar as at least a carbon brake or a charcoal briquette. Some embodiments include configuring the produced biochar as at least a cube shape, a flat shape, a flower pot shape, or a brick shape.

Some embodiments of system 100-a may include configuring the produced biochar as filtration for the cleanup of runoff from livestock feedlots. Some embodiments of system 100-a include configuring the produced biochar as a filter for the cleanup of various liquids and/or gases in general.

In some embodiments that may utilize system 100-a, the COH compound includes at least biomass or a waste stream. For example, some embodiments may utilize COH compounds, such as cellulose, lignin, and/or hemicellulose, which may be found in biomass. Many biomass feedstocks may have one or more of a mixture of cellulose, lignin, hemicellulose, and/or trace minerals in their component materials. Some embodiments may utilize feedstocks that include other COH compounds, such as paper waste, sawdust of a wide variety of wood types, cardboard, hay, straw, switchgrass, municipal solid waste, sanitized waste, demolition and construction wood waste; these various feedstocks may generally be referred to waste products. In general, materials that may include a COH compound may be utilized in different embodiments.

In some embodiments that may utilize system 100-a, heating the COH compound may be performed within the non-oxidation reaction chamber 110 configured as a tube furnace. The tube furnace may include a material composition that includes at least a high-nickel metal alloy. Some embodiments include using an auger to effect continuous motion of the COH compound into and through the tube furnace and wherein the COH compound is in a solid phase. In some embodiments, the auger includes a composition that includes at least a high-nickel metal alloy. In some embodiments, the auger includes at least a single blade pitch for multiple blades. In some embodiments, the auger includes multiple blades with multiple blade pitches.

In some embodiments that may utilize system 100-a, the COH compound includes a wet COH compound. Heating the COH compound may include reacting water from the wet COH compound with the COH compound to produce at least the produced biochar. Some embodiments include transferring the wet COH compound to a reaction chamber before heating the wet COH compound.

Some embodiments that may utilize system 100-a include a biochar product. The biochar product may include a graphite and/or graphene. The biochar product may include one or more of the following characteristics; a surface area of at least 300 $m^2/g$; a water holding capacity between 8 g/100 cc and 12 g/100 cc; a fixed carbon content greater than or equal to 80%; a volatile content less than or equal to 10%; or a pH greater than or equal to 8.5. In some embodiments, the biochar product has an ash content less than or equal to 10%.

In some embodiments that may utilize system 100-a, the biochar product may have an activation level or surface area of at least 300 $m^2/gm$; some embodiments be at least 360 $m^2/gm$. In some cases, post-processing may be done to the produced biochar to convert it to activated carbon.

In some embodiments that may utilize system 100-a, the biochar product has a water holding capacity of at least 80% of its weight. In some embodiments, biochar product has a fixed volatile content less than or equal to 2%. In some embodiments, the biochar product has a pH between 10 and 11. In some embodiments, the biochar product includes an ash content less than or equal to 10%.

These values and/or ranges of values for the different characteristics of the biochar product may be exemplary in nature. Other embodiments may include different values and/or ranges of values for the different characteristics.

In some embodiments that may utilize system 100-a, the biochar product is configured as a soil enhancer. The soil enhancer may be configured for at least nursery or greenhouse use. The soil enhancer may be configured for turfgrass use. Some embodiments include a binder mixed with the biochar product to form a solid form. The binder may include corn starch.

In some embodiments that may utilize system 100-a, the biochar product is configured as a compost product. Some embodiments include at least fungi, bacteria, protozoa, or actinobacteria combined with the biochar product.

In some embodiments that may utilize system 100-a, the biochar product is configured as an animal or livestock bedding or bedding additive. Some embodiments include a biomass or other product mixed with the biochar product. The biomass or other product may include wood chips, wood shavings, sawdust, rice hulls, peanut hulls, empty corn cobs, straw, hay, sand, and/or peat moss, for example. The animal or livestock bedding or bedding additive may include poultry bedding or bedding additive.

In some embodiments that may utilize system 100-a, the biochar product is configured as a supplement for an animal or livestock feed. The biochar product may be configured to be directly introduced into the animal or livestock feed.

In some embodiments that may utilize system 100-a, the biochar product is configured as activated carbon. In some embodiments, the biochar product is configured as a modifier for asphalt. Some embodiments include asphalt mixed with the biochar product.

In some embodiments that may utilize system 100-a, the biochar product is configured as at least a carbon brake or a charcoal briquette. In some embodiments, the biochar product is configured as at least a cube shape, a flat shape, a flower pot shape, or a brick shape.

Figure 1B:
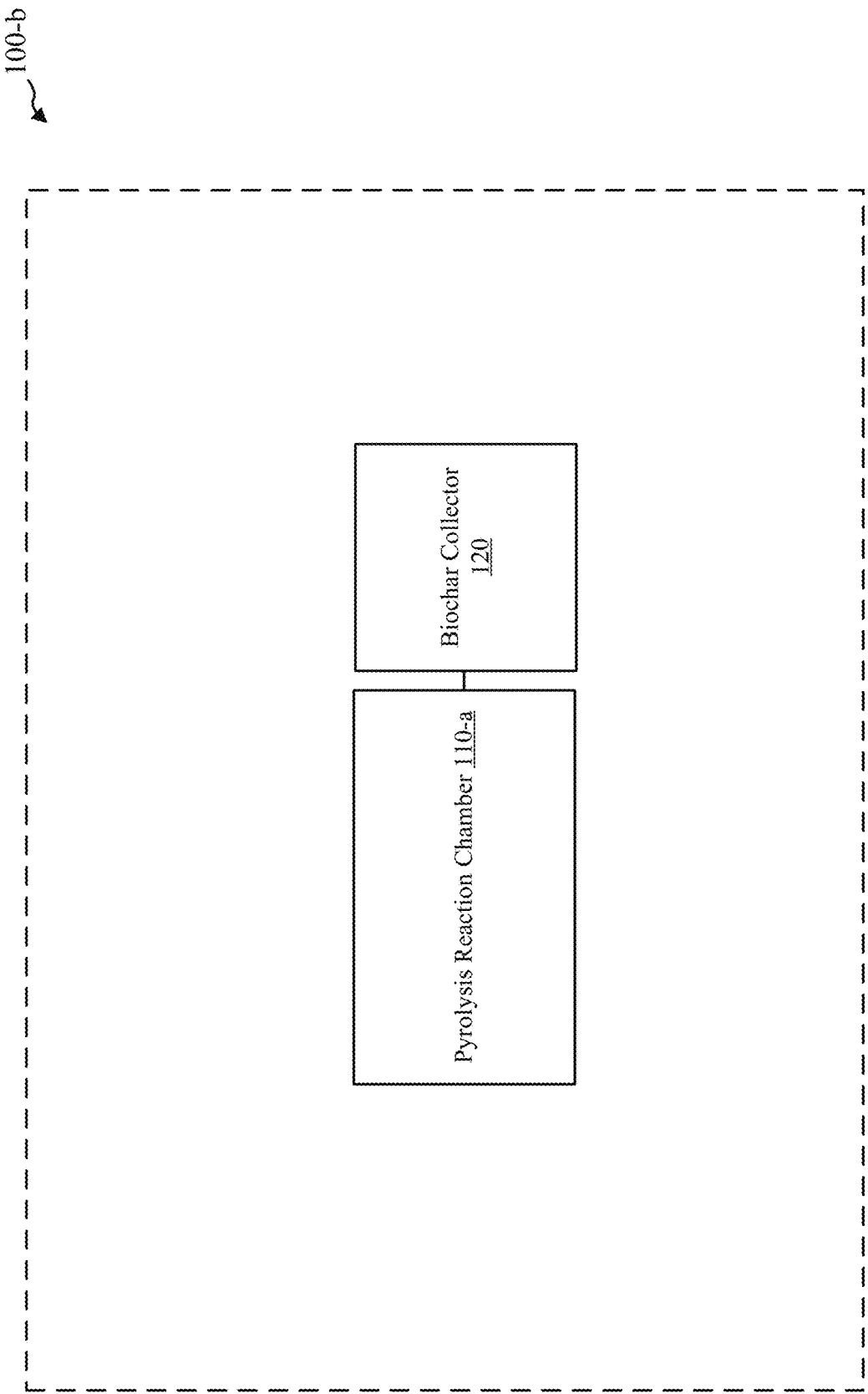
FIG. 1B shows a biochar production system in accordance with various embodiments.

Another general overview of a system 100-b for biochar production in accordance with various embodiments is provided with FIG. 1B. System 100-b may be an example of system 100-a of FIG. 1A. System 100-b may include a pyrolysis reaction chamber 110-a, which may be an example of the non-oxidation reaction chamber 110 of FIG. 1A. System 100-b may also include a biochar collector 120. The biochar collector 120 may be configured to collector the biochar after being produced in the biochar chamber. The biochar collector 120 may include a variety of different devices, including, but not limited to, hoppers, chutes, tubes, conveyors, and/or augers. In some embodiments, the pyrolysis reaction chamber 110-a may be configured for biochar production. The pyrolysis reaction chamber 110-a may be configured to utilize temperatures and residence times as discussed with respect to the non-oxidation reaction chamber 110.

Figure 1C:
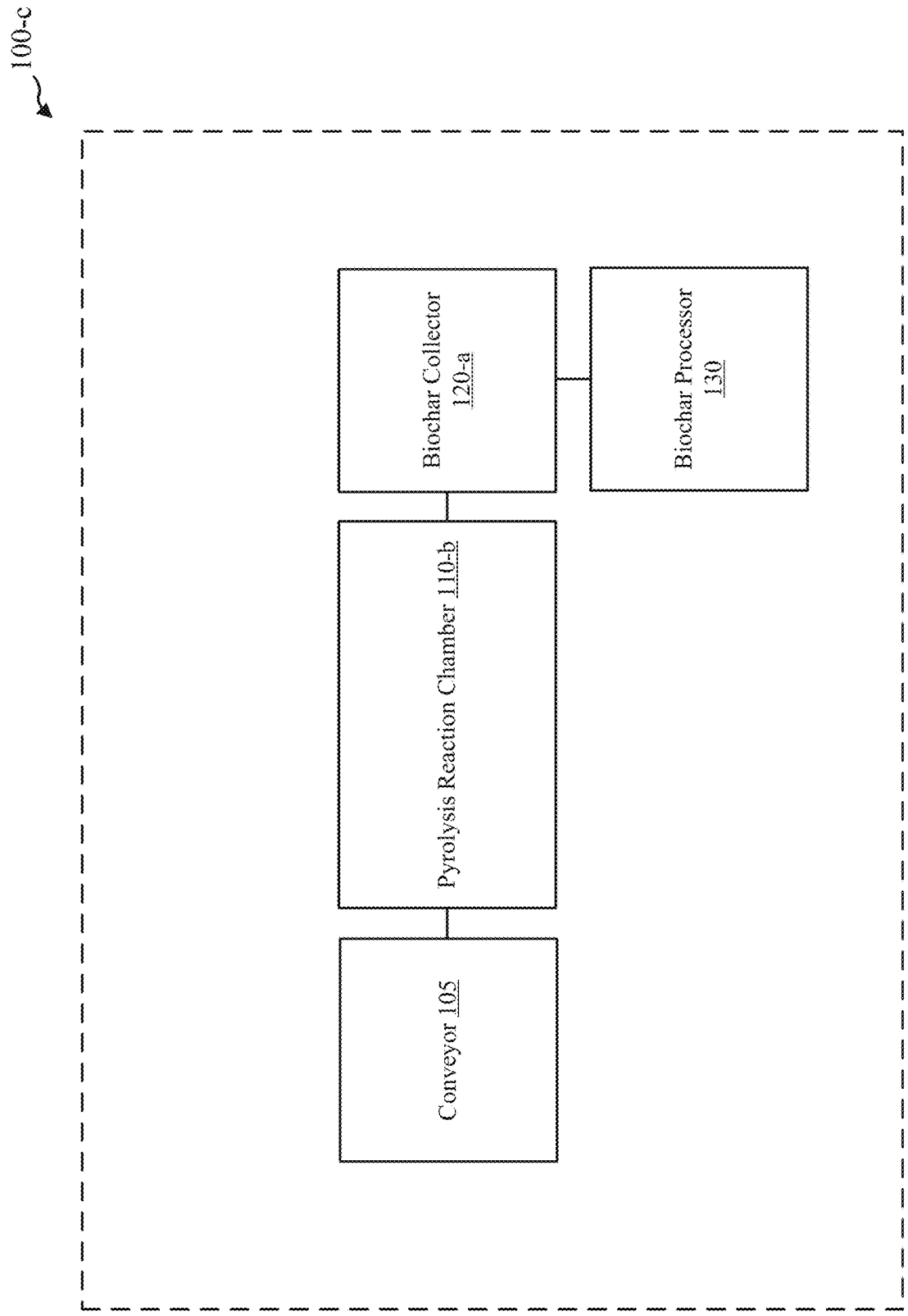
FIG. 1C shows a biochar production system in accordance with various embodiments.

Another general overview of a system 100-c for biochar production in accordance with various embodiments is provided with FIG. 1C. System 100-c may be an example of aspects of system 100-a of FIG. 1A and/or system 100-b of FIG. 1B. System 100-c may include a pyrolysis reaction chamber 110-b, which may be an example of the non-oxidation reaction chamber 110 of FIG. 1A or the pyrolysis reaction chamber 110-a of FIG. 1B, for example. System 100-c may also include a conveyor 105. Conveyor 105 may include a variety of different types of conveyors, including, but not limited to augers, conveyor belts, chutes, and/or hoppers. System 100-c may also include a biochar collector 120-*a* in some cases; the biochar collector 120-*a* may be an example of the biochar collector 120 of FIG. 1B. System 100-*c* may also include a biochar processor 130. The biochar processor 130 may include a variety of different components that may be utilized to process the biochar, such as to configure it for different uses including, but not limited to, soil enhancement, compost production, animal or livestock bedding or bedding additive, animal or livestock feed supplement, active carbon, asphalt modifier, livestock runoff filtration, gas and/or liquid filtration, carbon brakes, and/or charcoal briquettes. Biochar processor 130 may also be configured to shape the biochar into different shapes, such as cubes, sheets, pots, and/or bricks. Biochar processor 130 may include different mixing components and/or shaping components, such as vacuum and/or pressure molders. The pyrolysis reaction chamber 110-*b* may be configured to utilize temperatures and residence times as discussed with respect to the non-oxidation reaction chamber 110. In some embodiments, biochar processor 130 may include one or more grinders, such as a ball mill, which may be utilized to alter a size of the biochar, such as to make a uniform size of biochar. In some embodiments, the biochar processor 130 may be utilized to combine biochar with a 3D printing material, such as a plastic. The combined biochar with the 3D printing material may be formed into filaments in some embodiments. In some embodiments, the combined biochar with the 3D printing material may be utilized to form objects with a 3D printer.

Figure 1D:
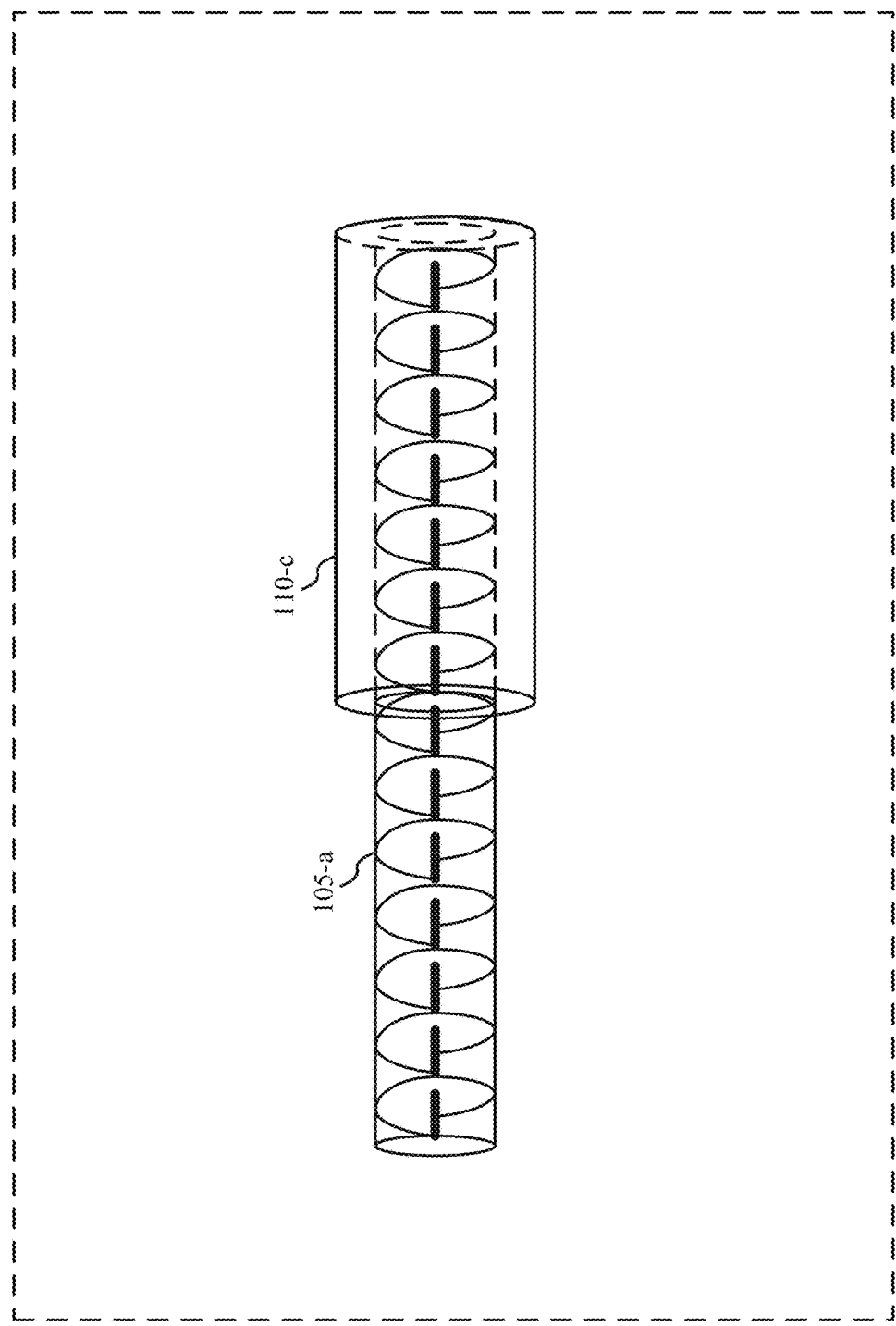
FIG. 1D shows a biochar production system in accordance with various embodiments.

FIG. 1D shows a system 100-*d* for biochar production in accordance with various embodiments. System 100-*d* may be an example of aspects of system 100-*a* of FIG. 1A, system 100-*b* of FIG. 1B, and/or system 100-*c* of FIG. 1C. System 100-*d* may include a tube furnace 110-*c*, which may be an example of the non-oxidation reaction chamber 110-*a* of FIG. 1A, the pyrolysis reaction chamber 110-*b* of FIG. 1B, and/or the pyrolysis reaction chamber 110-*c* of FIG. 1C. System 100-*d* may also include an auger 105-*a*, which may be an example of the conveyor 105 of FIG. 1C.

The tube furnace 110-*c* may be configured to heat a COH compound to a temperature of at least 1,000 degrees Celsius such that the COH compound reacts through a pyrolysis reaction to produce biochar; some embodiments may heat the COH compound to at least 1,100 degrees Celsius.

The auger 105-*a* may affect continuous motion of the material containing the COH compound into and through the tube furnace 110-*c*. The auger 105-*a* may include a material composition that may include at least a high-nickel metal alloy, such as a high-nickel steel alloy. In some embodiments, the auger 105-*a* may include multiple different pitches between multiple blades, though some embodiments may utilize a single uniform blade pitch. In some embodiments of system 100-*d*, the tube furnace 110-*c* may include a material composition that may include at least a high-nickel metal alloy, such as a high-nickel steel alloy.

These different configurations may be useful in achieving different residence times for the COH compound in the tube furnace 110-*c*. For example, the COH compound may have a residence time a tube furnace 110-*c* between 10 seconds and 1,000 seconds in some embodiments. Some embodiments may have a residence time in a tube furnace 110-*c* of less than 300 seconds and some embodiments may have a residence time of less than 120 seconds. Some embodiments may have a residence time greater than 30 seconds or greater than 60 seconds. For example, the following ranges of residence times in the tube furnace 110-*c* may be applicable to different embodiments: 10 seconds to 1,000 seconds, 10 seconds to 300 seconds, 10 seconds to 120 seconds; 30 seconds 1,000 seconds, 30 seconds to 300 seconds, 30 seconds to 120 seconds; 60 seconds to 1,000 seconds, 60 seconds to 300 seconds, or 60 seconds to 120 seconds.

Figure 1E:
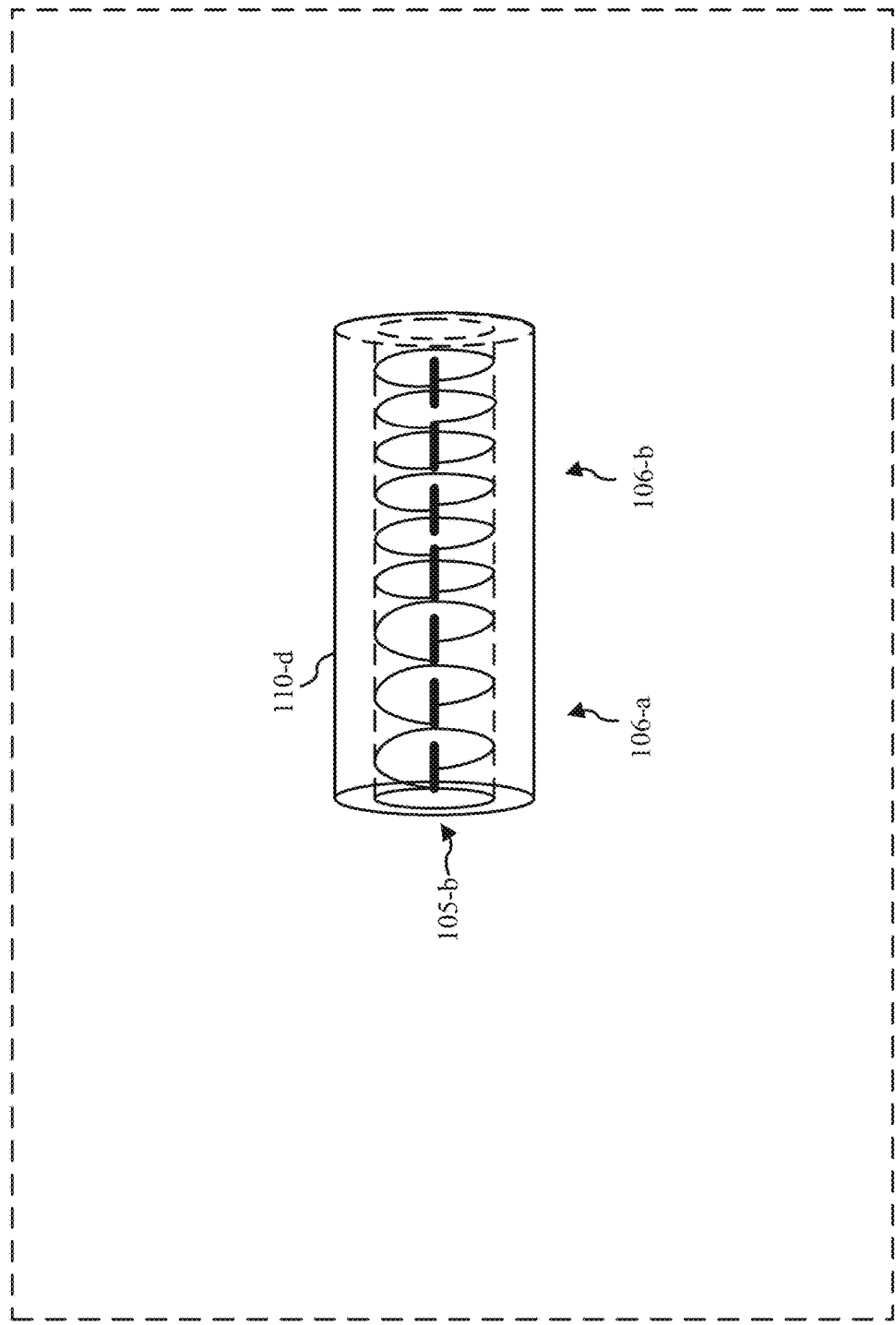
FIG. 1E shows a biochar production system in accordance with various embodiments.

FIG. 1E shows another system 100-*e* for biochar production in accordance with various embodiments. System 100-*e* may be an example of aspects of system 100-*a* of FIG. 1A, system 100-*b* of FIG. 1B, system 100-*c* of FIG. 1C, and/or system 100-*d* of FIG. 1D. System 100-*e* may include a tube furnace 110-*d*, which may be an example of the non-oxidation reaction chamber 110 of FIG. 1A, the pyrolysis reaction chamber 110-*a* of FIG. 1B, the pyrolysis reaction chamber 110-*b* of FIG. 1C, and/or the tube furnace 100-*c* of FIG. 1D. System 100-*e* may also include an auger 105-*b*, which may be an example of the conveyor 105 of FIG. 1C.

The tube furnace 110-*d* may be configured to heat a COH compound to a temperature of at least 1,000 degrees Celsius such that the COH compound reacts through a pyrolysis reaction to produce biochar. Some embodiments may be configured such that the tube furnace 110-*d* heats to the COH to at least 1,100 degrees Celsius.

The auger 105-*b* may affect continuous motion of the material containing the COH compound into and through the tube furnace 110-*d*. The auger 105-*b* may include a material composition that may include at least a high-nickel metal alloy, such as a high-nickel steel alloy. In some embodiments, the auger 105-*b* may include multiple different pitches between multiple blades. For example, auger 105-*b* may have a first section 106-*a*, which may have blades with a first pitch, and a second section 106-*b* with a second pitch. In this example, the second pitch may be less than the first pitch. This may result in the COH compound having a longer residence time per unit length in the second section 106-*b*, for example. Other variations may be utilized, such as more sections with different pitches. Increasing the pitching of a section may in general decrease the residence time per unit length. In some embodiments, increasing the residence time may be utilized to increase the amount of biochar produced. In some cases, decreasing the residence time may be utilized to affect the amount of pyrolysis occurring. In some embodiments of system 100-*d*, the tube furnace 110-*d* may include a material composition that may include at least a high-nickel metal alloy, such as a high-nickel steel alloy.

These different configurations may be useful in achieving different residence times for the COH compound in the tube furnace 110-*d*. For example, the COH compound may have a residence time in tube furnace 110-*d* between 10 seconds and 1,000 seconds in some embodiments. Some embodiments may have a residence time in tube furnace 110-*d* of less than 300 seconds and some embodiments may have a residence time of less than 120 seconds. Some embodiments may have a residence time greater than 30 seconds or greater than 60 seconds. For example, the following ranges of residence times in the tube furnace 110-*d* may be applicable to different embodiments: 10 seconds to 1,000 seconds, 10 seconds to 300 seconds, 10 seconds to 120 seconds; 30 seconds 1,000 seconds, 30 seconds to 300 seconds, 30 seconds to 120 seconds; 60 seconds to 1,000 seconds, 60 seconds to 300 seconds, or 60 seconds to 120 seconds.

Figure 1F:
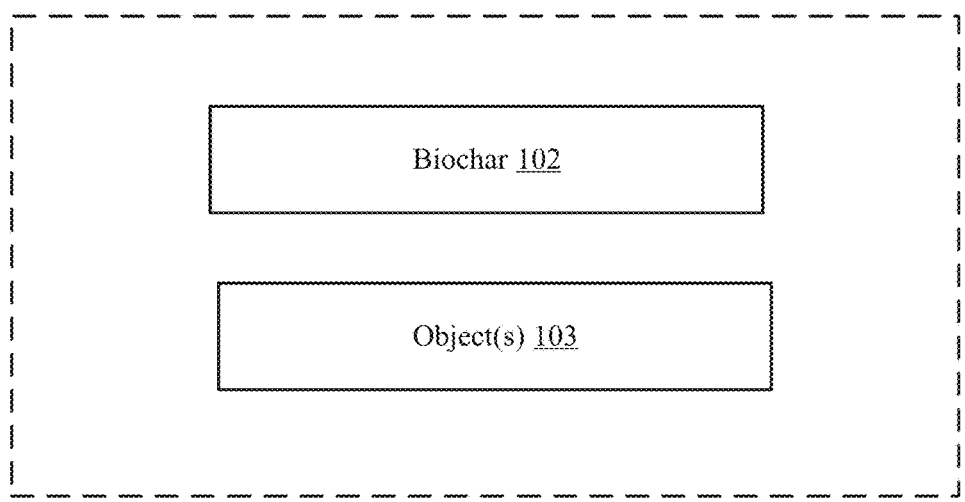
FIG. 1F shows a biochar system in accordance with various embodiments.

Turning now to FIG. 1F, a system 101 in accordance with various embodiments. System 101 may include biochar 102 and one or more objects 103. The biochar 102 may be produced in a variety of ways, including, but not limited, utilizing: the systems 100 of FIG. 1A, FIG. 1B, FIG. 1C, FIG. 1D, and/or FIG. 1E; and/or the method 400 of FIG. 4A and/or FIG. 4B. System 101 may be utilized to rub one or more objects with biochar 102. Rubbing the one or more objects 103 with biochar 102 may include, but is not limited to: polishing the one or more objects 103 utilizing the biochar 102; cleaning the one or more objects 103 utilizing the biochar 102; grinding the one or more objects 103 utilizing the biochar 102; scratching the one or more objects 103 utilizing the biochar 102; and/or abrading the one or more objects 103 utilizing the biochar 102. System 101 may utilize a variety of mechanisms for rubbing the one or more objects with the biochar, including, but limited to tumblers, pressure devices, and/or rotations devices.

In some embodiments, the biochar 102 includes graphene. In some embodiments, the biochar 102 includes graphene-like characteristics. In some embodiments, the biochar 102 includes graphite.

Some embodiments include separating the biochar 102 from the one or more objects 103 after rubbing the biochar 102 with the one or more objects. In some embodiments, the separated biochar 102 may be added to a soil.

Some embodiments include modifying a size of the biochar 102 before rubbing the one or more objects 103 with the biochar 102. Modifying the size of the biochar 102 may form a uniform size of the biochar 102. Modifying the size of the biochar 102 may include grinding the biochar utilizing a ball mill.

Some embodiments include producing the biochar 102. Producing the biochar 102 may include: introducing a compound that includes at least carbon, oxygen, and hydrogen into a reaction chamber; heating the compound to a temperature of at least 1,000 degrees Celsius in the reaction chamber such that the compound reacts through a pyrolysis reaction to produce biochar; and/or collecting the produced biochar 102.

In some embodiments, the temperature is at least 1,100 degrees Celsius. In some embodiments, the compound has a residence time in the reaction chamber between 10 seconds and 1,000 seconds to produce the biochar 102. The compound may have a residence time in the reaction chamber of 300 seconds or less to produce the biochar. The compound may have a residence time in the reaction chamber of 120 seconds or less to produce the biochar 102. In some embodiments, the pyrolysis reaction includes a hydrous pyrolysis reaction. A variety of residence time ranges may be utilized in accordance with various embodiments including, but not limited to: 10 seconds to 1,000 seconds, 10 seconds to 300 seconds, 10 seconds to 120 seconds; 30 seconds to 1,000 seconds, 30 seconds to 300 seconds, 30 seconds to 120 seconds; 60 seconds to 1,000 seconds, 60 seconds to 300 seconds, 60 seconds to 120 seconds; and/or 120 seconds to 300 seconds.

In some embodiments, the biochar 102 includes: a carbon component produced from at least biomass or a waste stream, wherein the carbon component includes at least graphite or graphene; a hydrogen component; and/or one or more mineral components originating from at least the biomass or the waste stream. The biochar 102 may have a surface area of at least 300 $m^2/g$. The biochar 102 may have a surface area of at least 360 $m^2/g$. The biochar 102 may have a water holding capacity of at least 80% of a weight of the biochar 102. The biochar 102 may have a fixed volatile content less than or equal to 2% of the biochar 102. The biochar 102 may have a pH between 10 and 11.

Figure 1G:
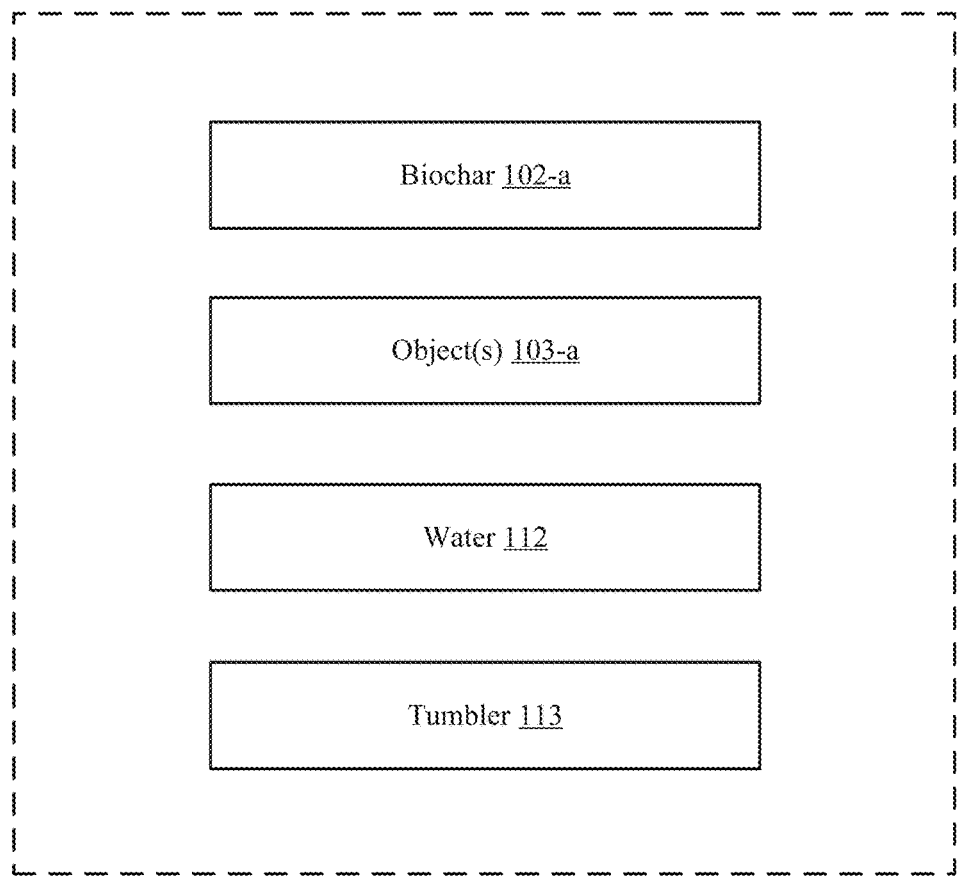
FIG. 1G shows a biochar system in accordance with various embodiments.
Figure 1H:
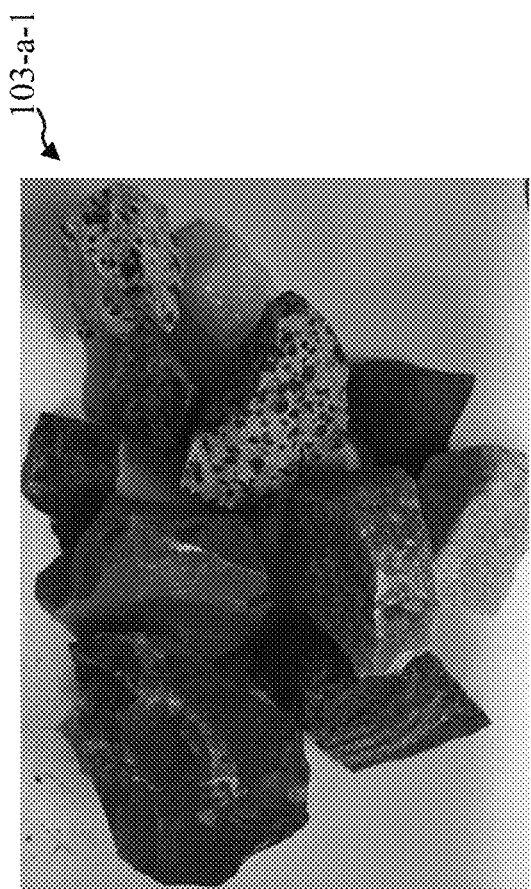
FIG. 1H shows photographs in accordance with various embodiments.
Figure 1H:
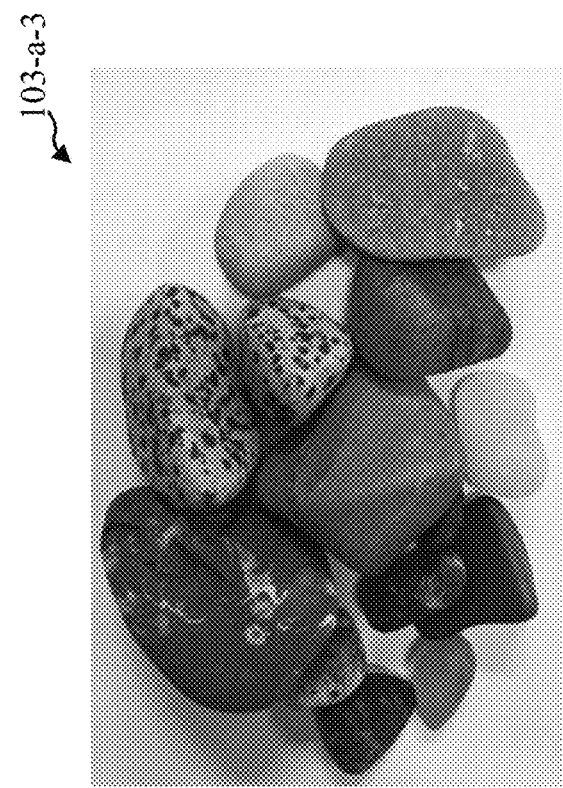
Figure 1H:
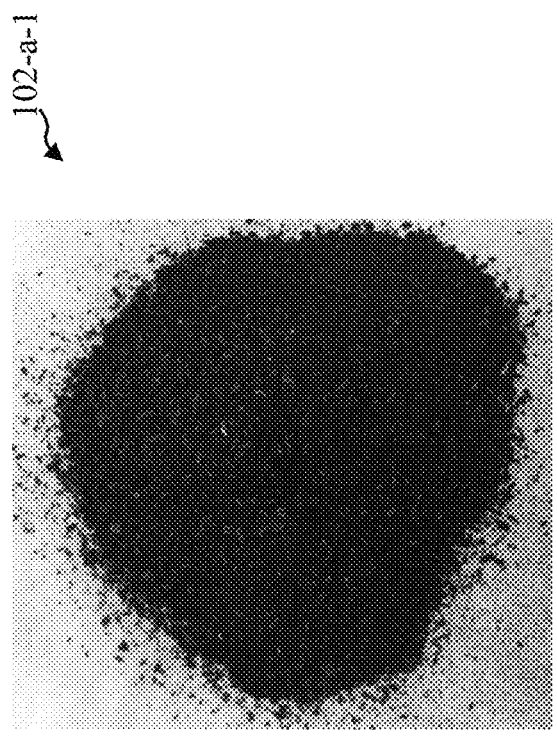
Figure 1H:
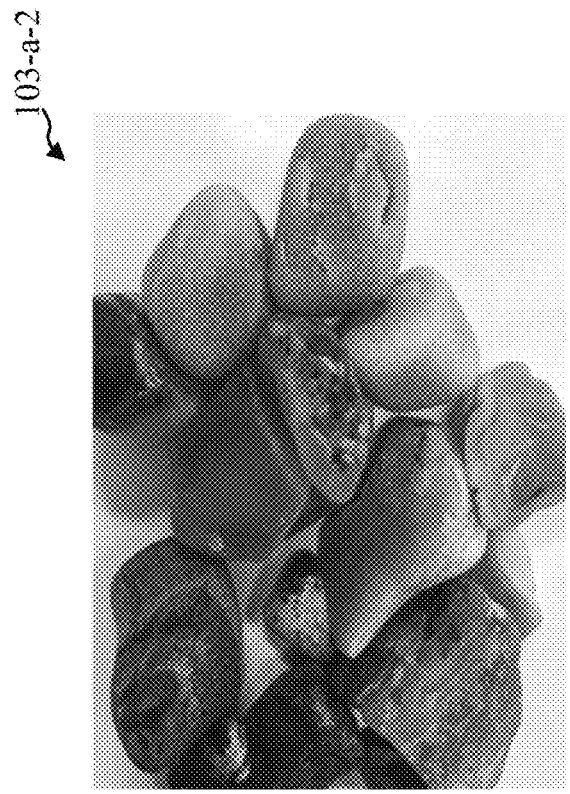

In some embodiments, polishing the one or more objects 103 utilizing the biochar 102 includes: combining water, the biochar 102, and the one or more objects 103; and/or tumbling the combined water, biochar 102, and one or more objects 103. The one or more objects 103 may include one or more stones. The tumbling may occur for 72 hours or less. The tumbling may occur as a single step. For example, FIG. 1G shows a system 101-a in accordance with various embodiments that may be utilized for this purpose; system 101-a may include biochar 102-a, one or more objects 103-a, water 112, and/or tumbler 113. System 101-a may be an example of system 101 of FIG. 1F. FIG. 1H shows several photographs in accordance with various embodiments. For example, biochar 102-a-1 in accordance with various embodiments is shown that may be utilized for polishing objects, such as objects 103-a-1 (a variety of stones in this example). Objects 103-a-2 show an example of stones that may have been polished utilizing a commercially available stone polishing set up. In general, a polishing mechanism may involve the use of a tumbler with grits may be utilized to get polished objects 103-a-2. The surface interaction of the stones and the grits may achieve the polishing. In general, the commercially available polishing may take more than 10 days (e.g., 26 days may be a minimum to achieve polishing in some situations; in general, a range of 22-31 days may be utilized). Furthermore, the polishing may involve multiple steps (e.g., four steps) utilizing multiple grits (e.g., Grit 1, Grit 2, Grit 3, and Grit 4). The tumbling times and speeds may vary with respect to the production of polished stones 130-a-2, such as Grit 1 for 3-5 days at a highest speed, Grit 2 for 6-8 days on a medium speed, Grit 3 for 6-8 days on a slowest speed, and/or Grit 4 for 7-10 days on slowest speed. In contrast, polishing of stones 103-a-3 utilizing biochar in accordance with various embodiments may achieved in a significantly different way than those shown with respect to stones 130-a-2. Biochar 102-a-1 produced in accordance with various embodiments may exhibit properties similar to commercially available graphene and may polish stones in less time (e.g., 3 days) to achieve similar results. Biochar 102-a-1, for example, may be combined with stones 103-a-1 in a tumbler (such as tumbler 113 of FIG. 1G); water, such as water 112 of FIG. 1G) may be added to cover stones 103-a-1. Some embodiments may utilize a single stage where the tumbler, for example, may be set for a specific time (e.g., 3 days, though other values may be utilized such as 2-5 days). The resulting polished stones 103-a-3 may result in much less time than traditional polishing techniques utilizing multiple grit stages. The stone polishing in accordance with various embodiments may achieve the polishing in approximately 90 percent less time or one tenth the time. The energy involved to polish the stones may be significantly reduced as a result of the reduced polishing time. The polishing grits that may be utilized in commercially available polishing systems may be indicated as poisonous and may clog the drainage system. In contrast, the biochar produced in accordance with various embodiments and utilized for polish, for example, may be safe for the environment and may not clog the drainage system. The biochar produced in accordance with various embodiments may reduce the cost of polishing the stones.

Figure 1I:
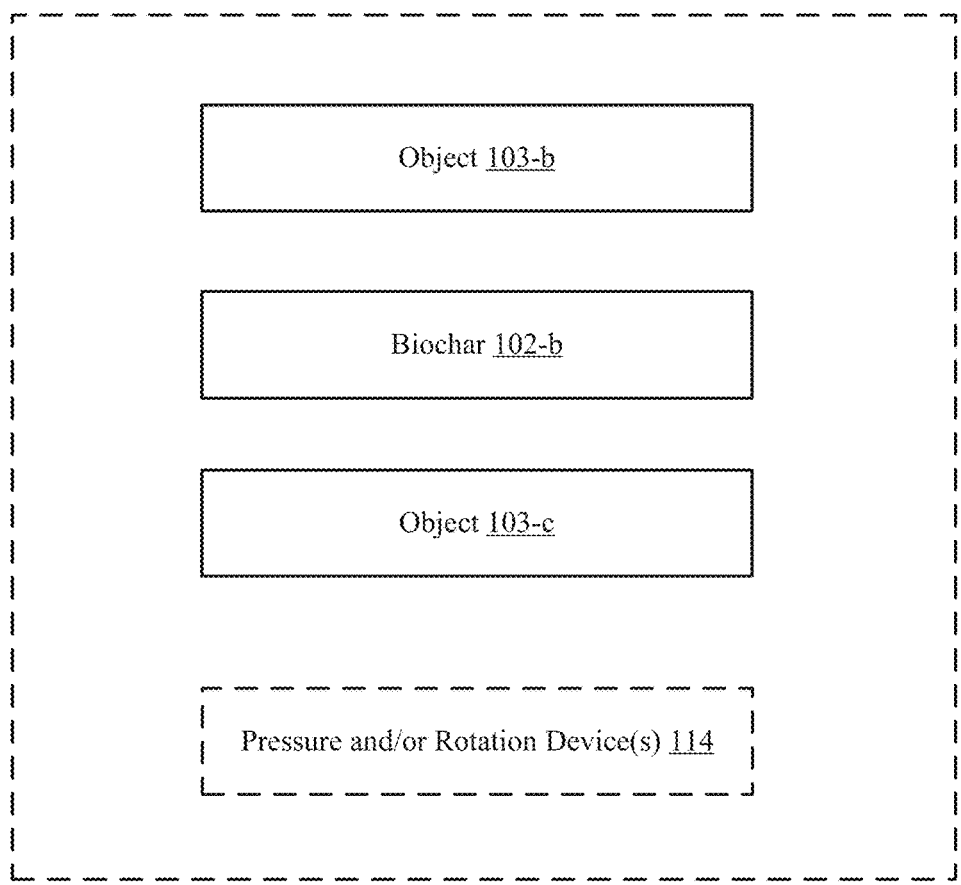
FIG. 1I shows a biochar system in accordance with various embodiments.

In some embodiments, polishing the one or more objects 103 utilizing the biochar 102 includes: positioning the biochar 102 between a first surface of a first object from the one or more objects 103 and a first surface of a second object from the one or more objects 103; and/or lapping the first surface of the first object and the first surface of the second object utilizing the biochar 103 positioned between the first surface of the first object and the first surface of the second object. For example, FIG. 1I shows a system 101-b in accordance with various embodiments that may be utilized for this purpose; system 101-b may include biochar 102-b that may be positioned between object 103-b and object 103-c. A pressure and/or rotation device 114 may be utilized in some embodiments to facilitate the lapping procedure, where a pressure device may be utilized to apply pressure to object 103-b and/or object 103-c; a rotation device may be utilized to rotate object 103-b and/or object 103-c. While this lapping procedure may be done with different devices, some embodiments may utilize human power. Some embodiments may utilize water, which may be combined with the biochar 102-b to create a slurry to be utilized for the lapping procedure.

Figure 1J:
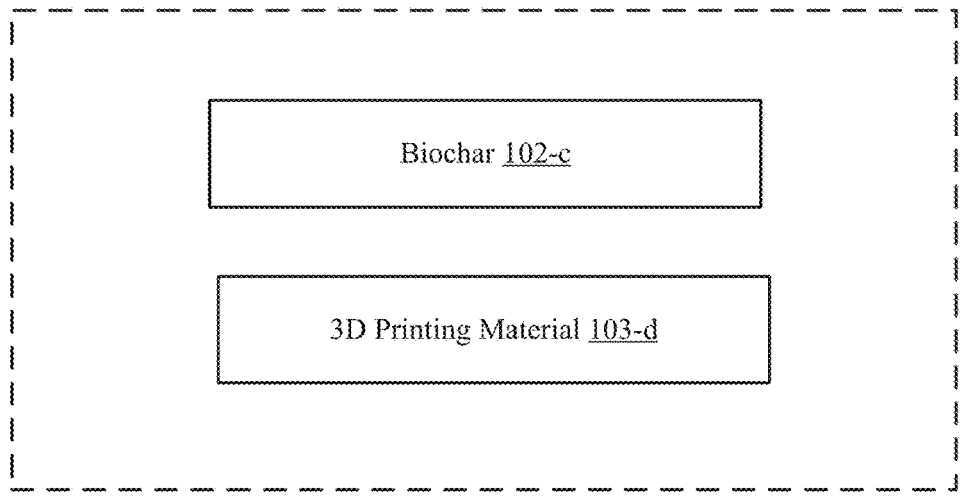
FIG. 1J shows a biochar system in accordance with various embodiments.
Figure 1K:
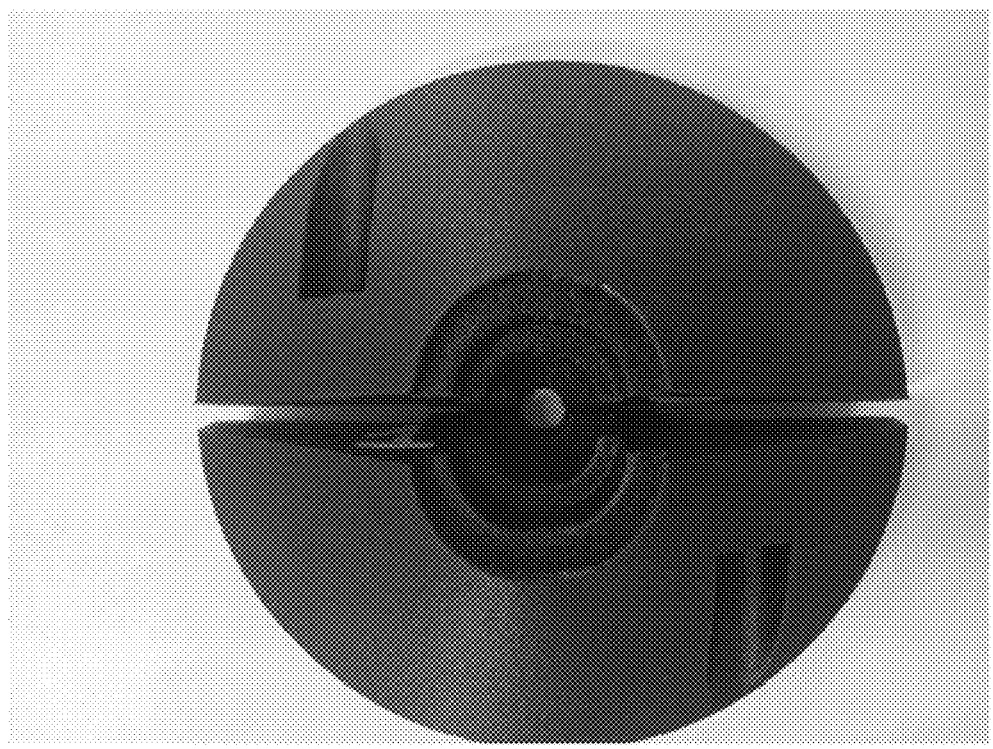
FIG. 1K shows a device in accordance with various embodiments.

In some embodiments, the biochar 102 may be combined with a 3D printing material as the one or more objects. For example, FIG. 1J shows a system 101-c that may include biochar 102-c and 3D printing material 103-d. The biochar 102-c and the 3D printing material 103-d may be combined. The 3D printing material 103-d may include plastic. In some embodiments, the biochar 102-c may be ground up before being combined with the 3D printing material 103-d. The combined biochar 102-c and the 3D printing material 103-d may be formed into filaments in some cases and may then be utilized in a variety of different 3D printers. The use of biochar with 3D printing materials may provide for light weight, high strength materials, with high elastic modulus. FIG. 1K shows an example of a 3D printed part 101-d produced in accordance with various embodiments from 3D printing material being combined with biochar.

Figure 1L:
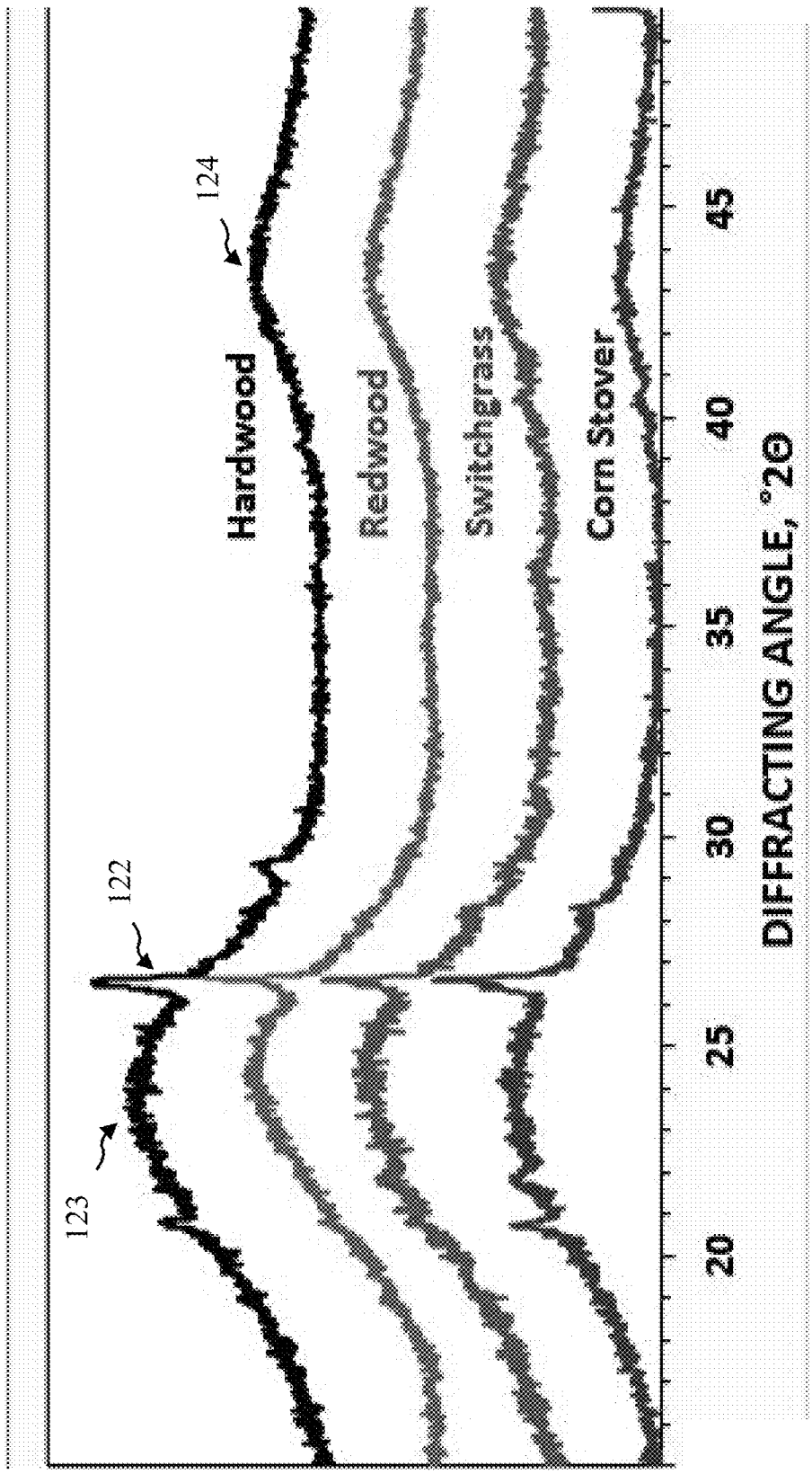
FIG. 1L, FIG. M, and FIG. N show graphs in accordance with various embodiments.

Turning now to FIG. 1L, a graph 121 of X-ray diffraction data for biochar produced in accordance with various embodiments is shown. Biochar in accordance with various embodiments may be produced from a variety of feedstocks, including, but not limited to, hardwood, redwood, switchgrass, and/or corn stover. Graph 121 may show graphite peaks 122; graph 121 also may show graphene-like bumps 123/124, which may reflect that the biochar produced in accordance with various embodiments may include graphene and/or may have graphene-like characteristics.

Figure 1M:
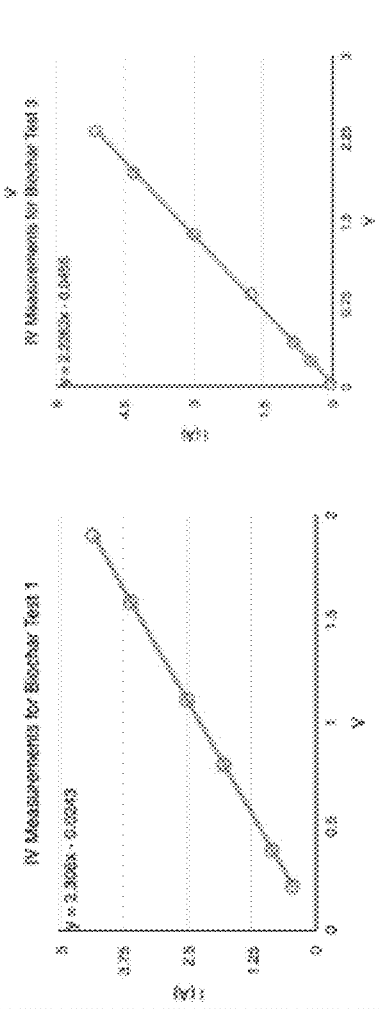
Figure 1M:
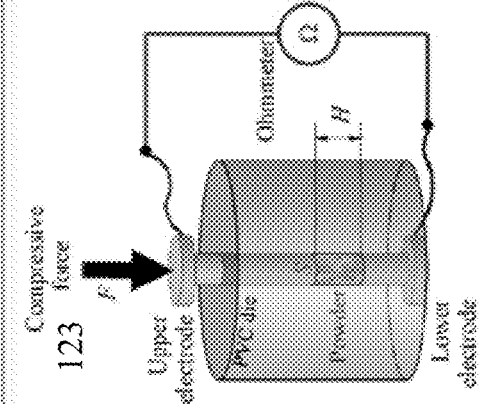

Turning now to FIG. 1M, graphs 131 of resistivity and/or conductivity data in accordance with various embodiments are provided. Data regarding conductivity of biochar produced in accordance various embodiments at a compressive force of approximately 1 MPa suggest the produced biochar may have a resistivity of approximately 0.0048 and/or a conductivity of approximately, 207, though biochar produced in accordance with various embodiments may have other values. In comparison, conductivity of powder graphene may be approximately 262.

Figure 1N:
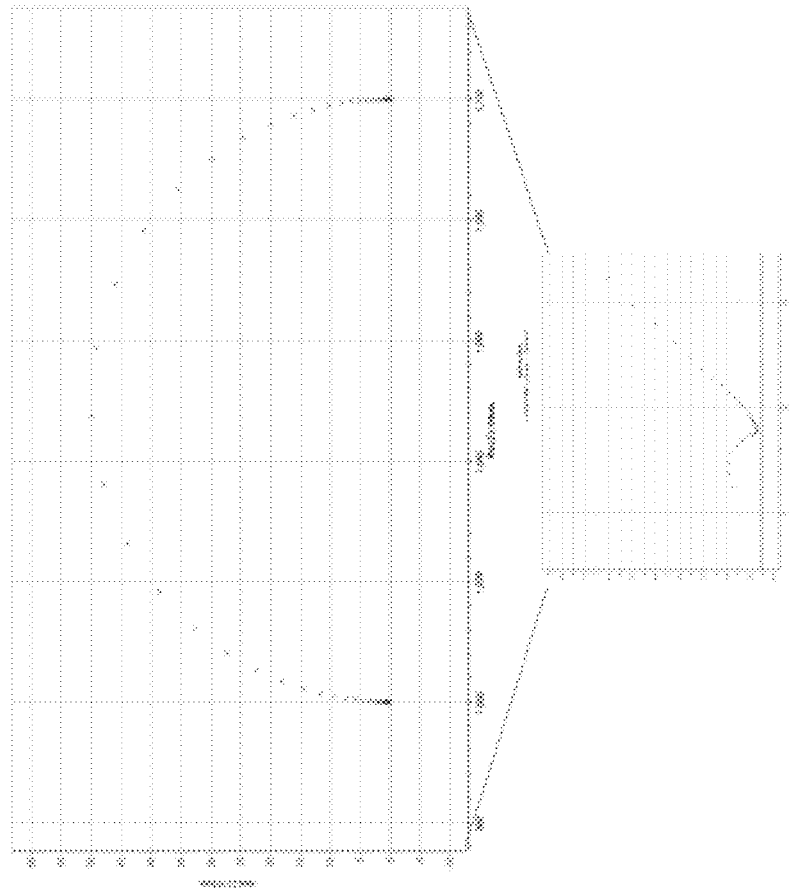

Turning now to FIG. 1N, a graph 141 of specific capacitance of biochar produced in accordance with various embodiments is provided. In some embodiments, biochar may be produced from almond. The double layer symmetric capacitance may be determined to be approximately 0.8901 F for a 0.0041 g of biochar coating, though biochar produced in accordance with various embodiments may have other values. This may result in a 217 F/g capacitor performance.

Figure 2A:
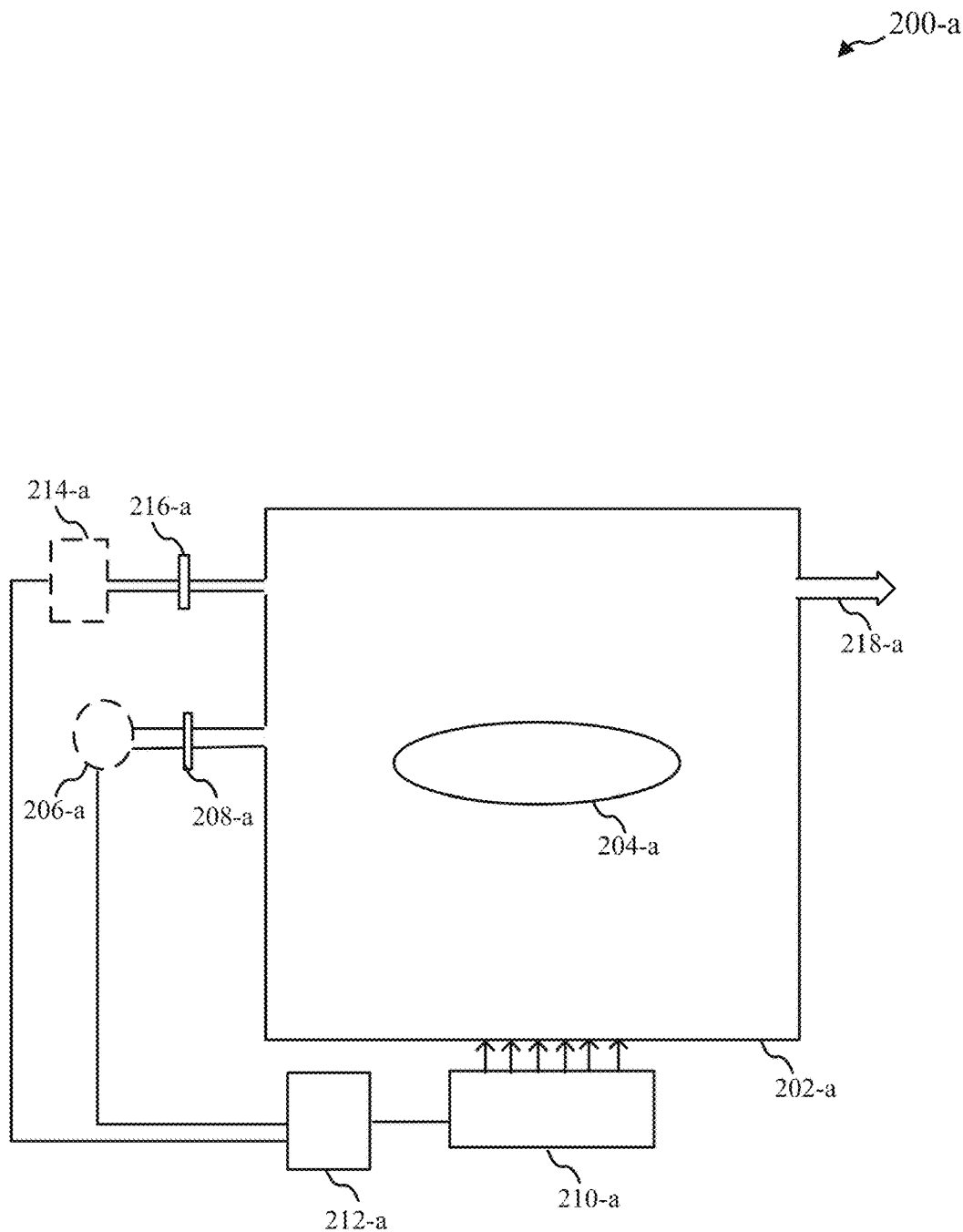
FIG. 2A is a schematic diagram of a system for biochar production in accordance with various embodiments.

Turning now to FIG. 2A, a system 200-a for biochar production in accordance with various embodiments is provided. In some embodiments, system 200-a may be an example of aspects of system 100-a of FIG. 1A, system 100-b of FIG. 1B, system 100-c of FIG. 1C, system 100-d of FIG. 1D, and/or system 100-e of FIG. 1E.

The system 200-a may include a chamber 202-a, a heating system 210-a in a thermal communication with the chamber 202-a, an optional gas supply line 214-a for providing inert and/or non-inert gas into the chamber 202-a, an optional water supply line 206-a for water to be added to the chamber 202-a by using optional valve 208-a, an exit line 218-a to allow the products (such as biochar, for example) to exit the chamber 202-a to move into other components (not shown). Components such as chamber 202-a may be examples of aspects of non-oxidation reaction chamber 110 of FIG. 1A, pyrolysis reaction chamber 110-a of FIG. 1B, the pyrolysis reaction chamber 110-b of FIG. 1C, the tube furnace 110-c of FIG. 1D, and/or the tube furnace 110-d of FIG. 1E.

The COH compound 204-a may be disposed within the chamber 202-a. Examples of COH compounds 204-a, which may be found suitable for methods in accordance with various embodiments may include, but are not limited to, sources of biomass such as cellulose, hemicellulose, and/or sources of lignin, such as found in biomass. Some processes may use an inert and/or non-inert gas, which may be admitted to the chamber 202-a through one or more valves 216-a; the controller 212-a may control when to continuously purge chamber 202-a with inert and/or non-inert gas by using a valve 216-a. The controller 212-a may also control the heating system 210-a to provide the elevated temperatures that the chamber needs to cause the COH compound 204-a to be dissociated and/or reacted in the environment within the chamber 202-a. In some embodiments, the heating system 202-a may be configured to heat the chamber 202-a to at least 1,000 degrees Celsius; some embodiments may be configured to heat the chamber to at least 1,100 degrees in some cases. The controller 212-a may also control the rate of speed of the insertion of the material containing the COH compound into the chamber 202-a. In some embodiments, the controller 212-a may further control the temperature of the heating system 210-a to heat the COH compound 204-a to cause the chemical reaction of the COH compound 204-a.

During the COH compound processing, the system 200-a may run between atmospheric pressure and a slightly greater pressure, which may be up to about 20 torr gage or more in some cases. This may serve to minimize leaks of air in the system and may significantly reduce the risk of an escalating pressure event, such as an explosion.

In some embodiments, the optional water supply line 206-a may be configured such that water may be combined with the COH compound to create a wet form of the compound before it is introduced into chamber 202-a. Some embodiments may include a conveyor mechanism (not shown) that may be utilized to transfer the wet compound into the chamber 202-a. Some conveyor mechanisms may be utilized to convey the COH compound through chamber 202-a.

The controller 212-a may be utilized to control the residence time of the COH compound in the chamber 202-a. For example, the COH compound may have a residence time in chamber 202-a between 10 seconds and 1,000 seconds in some embodiments. Some embodiments may have a residence time in the chamber 202-a of less than 300 seconds and some embodiments may have a residence time of less than 120 seconds. Some embodiments may have a residence time greater than 30 seconds or greater than 60 seconds. For example, the following ranges of residence times in the chamber 202-a, controlled by controller 212-a, may be applicable to different embodiments: 10 seconds to 1,000 seconds, 10 seconds to 300 seconds, 10 seconds to 120 seconds; 30 seconds 1,000 seconds, 30 seconds to 300 seconds, 30 seconds to 120 seconds; 60 seconds to 1,000 seconds, 60 seconds to 300 seconds, or 60 seconds to 120 seconds.

Figure 2B:
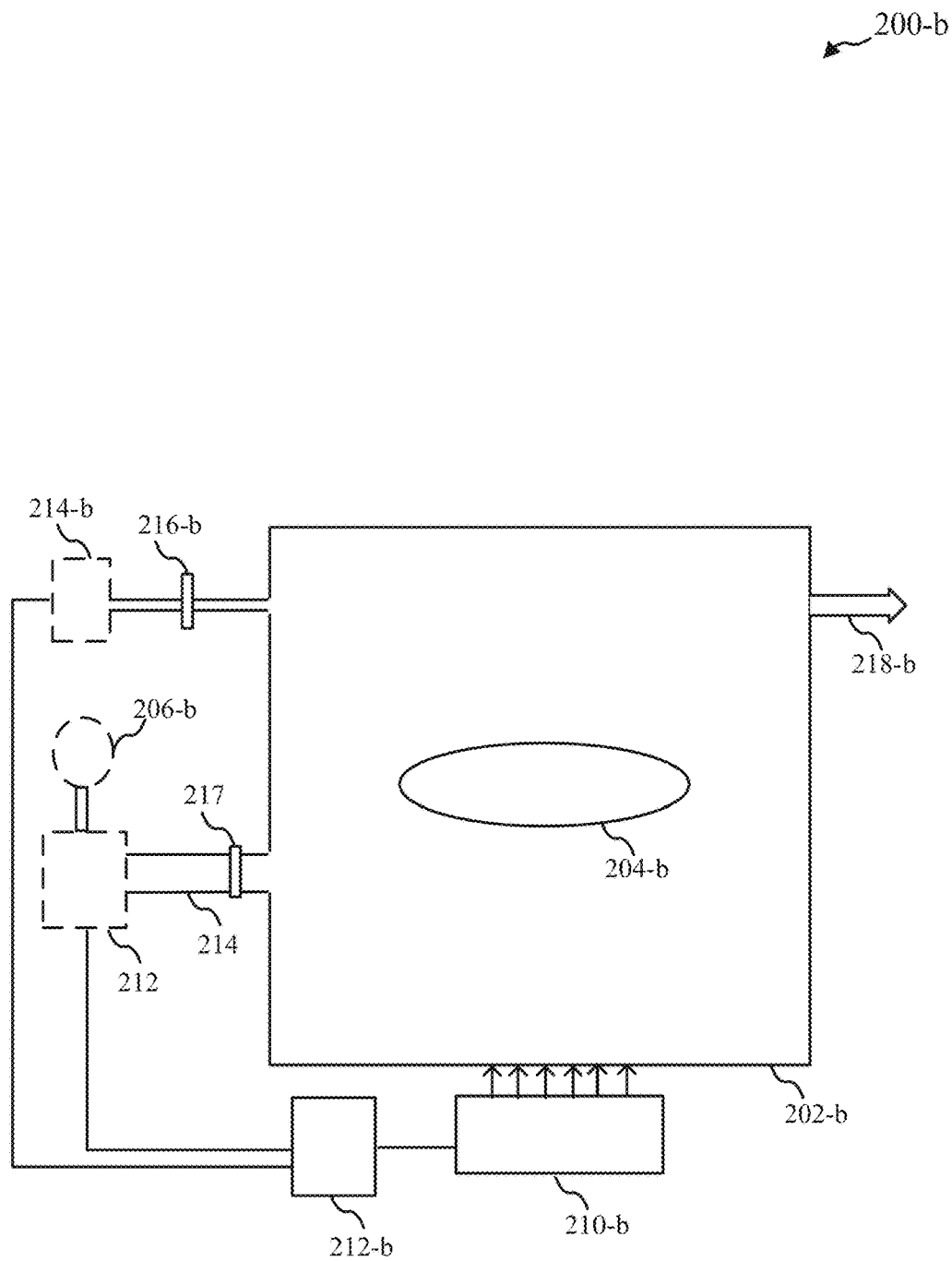
FIG. 2B is a schematic diagram of a system for biochar production in accordance with various embodiments.

A general overview of another simplified system 200-b for biochar production in accordance with various embodiments is provided with FIG. 2B. In some embodiments, system 200-b may be an example of the aspects of system 100-*a* of FIG. 1A, system 100-*b* of FIG. 1B, system 100-*c* of FIG. 1C, system 100-*d* of FIG. 1D, and/or system 100-*e* of FIG. 1E.

The system 200-*b* may include a chamber 202-*b*, a heating system 210-*b* in a thermal communication with the chamber 202-*b*, an optional gas supply line 214-*b* for providing inert and/or non-inert gas into the chamber 202-*b*, an optional water supply line 206-*b* for water to be added to a COH compound within an optional feed stock hopper or chamber 222, an exit line 218-*b* to allow the products (such as biochar) to exit the chamber 202-*b*, and/or a controller 212-*b*. The COH compound 204-*b* may disposed within the chamber 202-*b*. Examples of COH compounds 204-*b*, which may be wet or dry, that may be found suitable for methods in accordance with various embodiments include, but are not limited to, sources of biomass such as cellulose, hemicellulose, and/or sources of lignin, such as found in biomass. Components such as chamber 202-*b* may be examples of aspects of non-oxidation reaction chamber 110 of FIG. 1A, pyrolysis reaction chamber 110-*a* of FIG. 1B, pyrolysis reaction chamber 110-*b* of FIG. 1C, tube furnace 110-*c* of FIG. 1D, and/or tube furnace 110-*d* of FIG. 1E.

Some embodiments may utilize processes that may use inert and/or non-inert gases, admitted to the chamber 202-*b* through one or more valves 216-*b*, which may be controlled by controller 212-*b*. The controller 212-*b* may control when to continuously purge chamber 202-*b* with inert and/or non-inert gases by using a valve 216-*b*, for example. The controller 212-*b* may control the heating system 210-*b* to provide the elevated temperatures within the chamber 202-*b* to cause the COH compound 204-*b* to be dissociated in the environment within the chamber 202-*b*. In some embodiments, the heating system 202-*b* may be configured to heat the chamber 202-*b* to at least 1,000 degrees Celsius, and/or at least 1,100 degrees Celsius. The controller 212-*b* may also control the rate of speed of the insertion of material containing the COH compound into the chamber 202-*b*. A valve 217 may be utilized in some cases. The controller 212-*b* may further control the temperature of the heating system 210-*b* to heat the COH compound 204-*b* to cause the chemical reaction of the COH compound 204-*b*. The controller 212-*b* may be utilized to control the residence time of the COH compound in the chamber 202-*b*. For example, the COH compound may have a residence time in chamber 202-*b* between 10 seconds and 1,000 seconds in some embodiments. Some embodiments may have a residence time in the chamber 202-*b* of less than 300 seconds and some embodiments may have a residence time of less than 120 seconds. Some embodiments may have a residence time greater than 30 seconds or greater than 60 seconds. For example, the following ranges of residence times in the chamber 202-*b*, controlled by controller 212-*b*, may be applicable to different embodiments: 10 seconds to 1,000 seconds, 10 seconds to 300 seconds, 10 seconds to 120 seconds; 30 seconds 1,000 seconds, 30 seconds to 300 seconds, 30 seconds to 120 seconds; 60 seconds to 1,000 seconds, 60 seconds to 300 seconds, or 60 seconds to 120 seconds.

During the biomass processing, the system 200-*b* may run at between atmospheric pressure and a slightly greater pressure, which may be about 20 torr gage or more in some cases. This may serve to minimize leaks in the system and may significantly reduce the risk of an escalating pressure event such as an explosion, for example.

In some embodiments, the optional water supply line 206-*b* may be configured such that water may be combined with the COH compound to create a wet form of the compound before it is introduced into chamber 202-*b*, such as in feedstock hopper or chamber 222. Some embodiments may include a conveyor mechanism 214 that may be utilized to transfer the wet or dry compound into the chamber 202-*b*. The conveyor mechanism 214 may include an auger in some cases. Some embodiments may utilize gravity to help transfer the material containing the COH compound into chamber 202-*b*. In some cases, the material containing the COH compound may be manually transferred into the chamber 202-*b*.

Figure 4A:
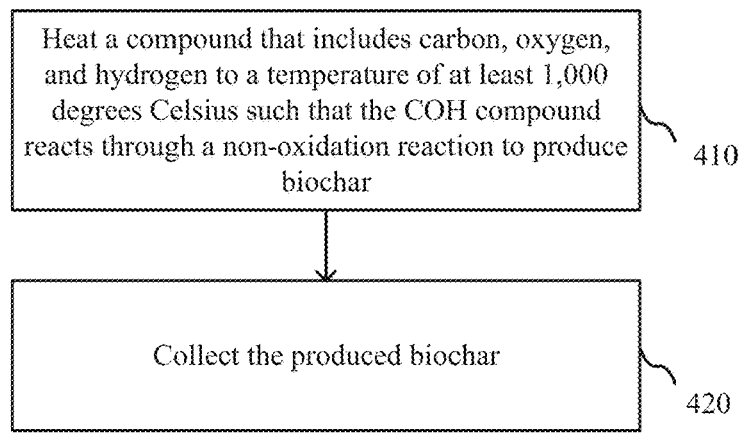
FIG. 4A shows a flowchart for a method of biochar production in accordance with various embodiments.

FIG. 4A provides an overview of a flowchart of a method 400 of biochar production accordance with various embodiments. Method 400 may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 200-*a* of FIG. 2A, and/or system 200-*b* of FIG. 2B, for example. In FIG. 4A, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants may be noted in the description that follows.

At block 410, a compound that includes at least carbon, oxygen, and hydrogen (a COH compound) may be heated to a temperature of at least 1,000 degrees Celsius such that the COH compound reacts through a non-oxidation reaction to produce biochar. At block 420, the produced biochar may be collected.

In some embodiments of the method, the non-oxidation reaction includes a pyrolysis reaction. The non-oxidation reaction may include a hydrous pyrolysis reaction. In some embodiments, the COH compound may be heated to at least 1,100 degrees Celsius.

In some embodiments, the COH compound may have a residence time in a reaction chamber between 10 seconds and 1,000 seconds to produce the biochar in some embodiments. Some embodiments may have a residence time in the reaction chamber of less than 300 seconds and some embodiments may have a residence time of less than 120 seconds to produce the biochar. Some embodiments may have a residence time greater than 30 seconds or greater than 60 seconds to produce the biochar. For example, the following ranges of residence times in a reaction chamber to produce the biochar may be applicable to different embodiments: 10 seconds to 1,000 seconds, 10 seconds to 300 seconds, 10 seconds to 120 seconds; 30 seconds 1,000 seconds, 30 seconds to 300 seconds, 30 seconds to 120 seconds; 60 seconds to 1,000 seconds, 60 seconds to 300 seconds, or 60 seconds to 120 seconds.

Some embodiments of the method may include augmenting or amending a soil with the produced biochar. The produced biochar may be configured as a soil enhancer. The produced biochar as the soil enhancer may include forming a biochar slurry with the produced biochar; mixing a binder with the biochar slurry to form a mixed biochar slurry; and/or molding the mixed biochar slurry into a solid form. Molding the mixed biochar slurry into the solid form may include utilizing at least a vacuum molding process or a pressure molding process. The binder may include corn starch.

Some embodiments of the method include configuring the produced biochar as a compost product. Configuring the produced biochar as the compost product may include introducing at least fungi, bacteria, protozoa, or actinobacteria with the produced biochar.

Some embodiments of the method include configuring the produced biochar as an animal or livestock bedding or bedding additive. Configuring the produced biochar as the animal or livestock bedding or bedding additive may include mixing the produced biochar with a biomass or other product. The biomass or other product may include wood chips, wood shavings, sawdust, rice hulls, peanut hulls, empty corn cobs, straw, hay, sand, and/or peat moss, for example. The animal or livestock bedding or bedding additive may include poultry bedding or bedding additive.

Some embodiments of the method include configuring the produced biochar as a supplement for animal or livestock feed. Some embodiments include introducing the produced biochar directly into the animal or livestock feed.

Some embodiments of the method include configuring the produced biochar as activated carbon. Some embodiments of the method include configuring the produced biochar as a modifier for asphalt. Configuring the produced biochar as the asphalt modifier may include mixing the produced biochar with the asphalt. Some embodiments include configuring the produced biochar as at least a carbon brake or a charcoal briquette. Some embodiments include configuring the produced biochar as at least a cube shape, a flat shape, a flower pot shape, or a brick shape. Some embodiments include configuring the produced biochar as filtration for the cleanup of runoff from livestock feedlots. Some embodiments include configuring the produced biochar as a filter for the cleanup of various liquids and/or gases in general.

In some embodiments of the method, heating the COH compound may be performed within a tube furnace. The tube furnace may include a material composition that includes at least a high-nickel metal alloy. Some embodiments include using an auger to effect continuous motion the COH compound into and through the tube furnace and wherein the COH compound is in a solid phase. In some embodiments, the auger includes a composition that includes at least a high-nickel metal alloy. In some embodiments, the auger includes at least a single blade pitch for multiple blades. In some embodiments, the auger includes multiple blades with multiple blade pitches.

In some embodiments of the method, the COH compound includes a wet COH compound. Heating the COH compound may include reacting water from the wet COH compound with the COH compound to produce at least the produced biochar. Some embodiments include transferring the wet COH compound to a reaction chamber before heating the wet COH compound.

Figure 4B:
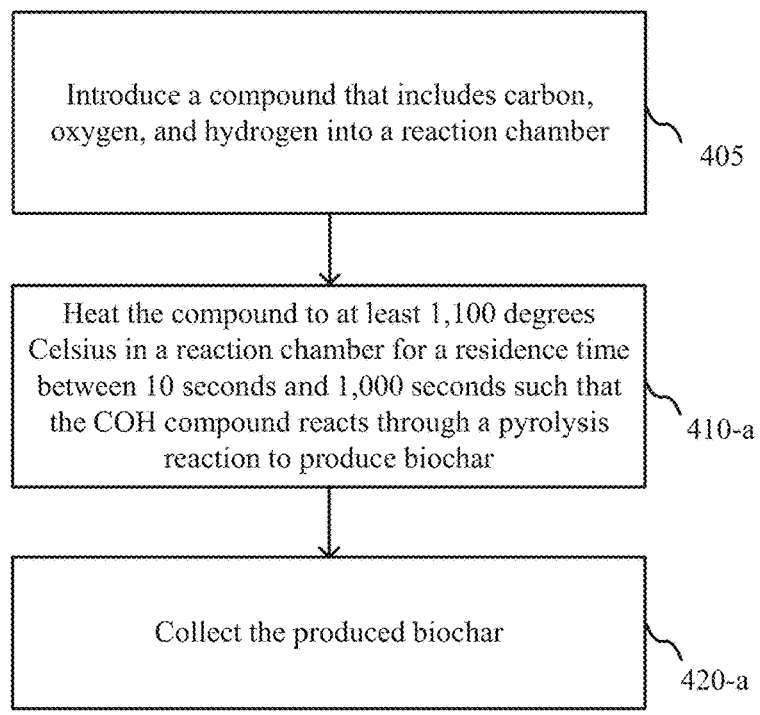
FIG. 4B shows a flowchart for a method of biochar production in accordance with various embodiments.

FIG. 4B provides an overview of a flowchart of a method 400-a of biochar accordance with various embodiments. Method 400-a may be implemented utilizing aspects of system 100-a of FIG. 1, system 100-b of FIG. 1B, system 100-c of FIG. 1C, system 100-d of FIG. 1D, system 100-e of FIG. 1E, system 200-a of FIG. 2A, and/or system 200-b of FIG. 2B, for example. In FIG. 4B, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants may be noted in the description that follows. Method 400-a may be an example of method 400 of FIG. 4A.

At block 405, a compound that includes at least carbon, oxygen, and hydrogen may be introduced into a reaction chamber. At block 410-a, the compound may be heated to at least 1,100 degrees Celsius in a reaction chamber for a residence time between 10 seconds and 1,000 seconds such that the compound reacts through pyrolysis reaction to produce biochar. At block 420-a, the produced biochar may be collected.

Figure 4C:
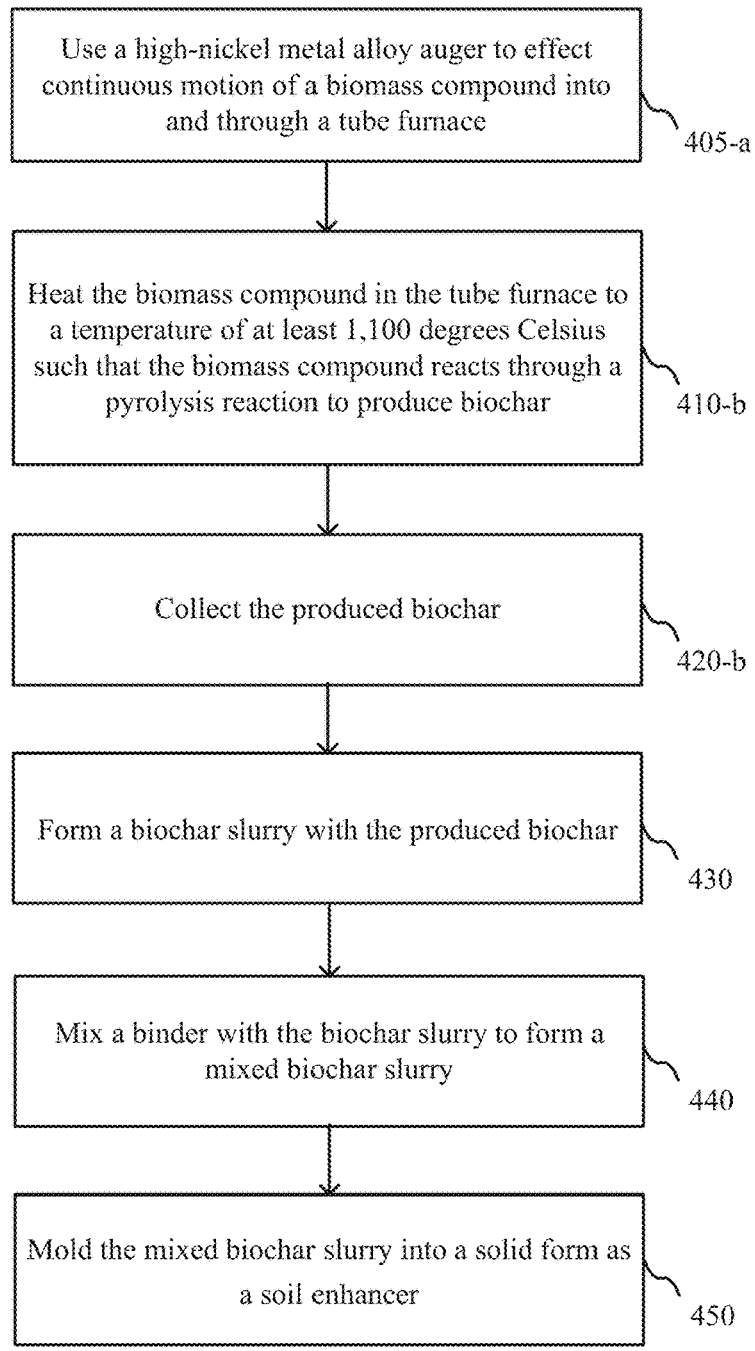
FIG. 4C shows a flowchart for a method of biochar production in accordance with various embodiments.

FIG. 4C provides an overview of a flowchart of a method 400-b of biochar accordance with various embodiments. Method 400-b may be implemented utilizing aspects of system 100-a of FIG. 1, system 100-b of FIG. 1B, system 100-c of FIG. 1C, system 100-d of FIG. 1D, system 100-e of FIG. 1E, system 200-a of FIG. 2A, and/or system 200-b of FIG. 2B, for example. In FIG. 4C, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants may be noted in the description that follows. Method 400-b may be an example of method 400 of FIG. 4A and/or method 400-a of FIG. 4B.

At block 405-a, a high-nickel alloy auger may be used to effect continuous motion of a biomass compound into and through a tube furnace. At block 410-b, a biomass compound may be heated to a temperature of at least 1,100 degrees Celsius such that the biomass compound reacts through a pyrolysis reaction to produce biochar. At block 420-b, the produced biochar may be collected.

At block 430, a biochar slurry may be formed with the produced biochar. At block 440, a binder may be mixed with the biochar slurry to form a mixed biochar slurry. The binder may include corn starch or other binders. At block 450, the mixed biochar slurry may be molded into a solid form. Molding the mixed biochar slurry into the solid form may include utilizing at least a vacuum molding process or a pressure molding process.

Figure 5A:
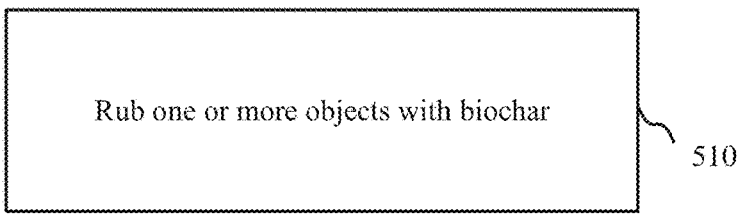
FIG. 5A shows a flowchart for a biochar method in accordance with various embodiments.

FIG. 5A provides an overview of a flowchart of a biochar method 500-a in accordance with various embodiments. Method 500-a may be implemented utilizing aspects of system 100-a of FIG. 1, system 100-b of FIG. 1B, system 100-c of FIG. 1C, system 100-d of FIG. 1D, system 100-e of FIG. 1E, system 101 of FIG. 1F, system 101-a of FIG. 1G, system 101-b of FIG. 11, system 200-a of FIG. 2A, and/or system 200-b of FIG. 2B, for example. In FIG. 5A, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants may be noted in the description that follows.

For example, at block 510, one or more objects may be rubbed with biochar. Rubbing the one or more objects with biochar may include, but is not limited to: polishing, grinding, scratching, and/or abrading the one or more objects with the biochar In some embodiments of method 500-a, polishing the one or more objects utilizing the biochar includes: combining water, the biochar, and the one or more objects; and/or tumbling the combined water, biochar, and one or more objects. The one or more objects may include one or more stones. The tumbling may occur for 72 hours or less. The tumbling may occur as a single step.

In some embodiments of method 500-a, polishing the one or more objects utilizing the biochar includes: positioning the biochar between a first surface of a first object from the one or more objects and a first surface of a second object from the one or more objects; and/or lapping the first surface of the first object and the first surface of the second object utilizing the biochar positioned between the first surface of the first object and the first surface of the second object.

In some embodiments of method 500-*a*, the biochar includes graphene. In some embodiments, the biochar includes graphene-like characteristics. In some embodiments, the biochar includes graphite.

Some embodiments of the method 500-*a* include: separating the biochar from the one or more objects after utilizing the biochar; and/or applying the separated biochar to a soil.

Some embodiments of method 500-*a* include modifying a size of the biochar before rubbing the one or more objects with the biochar. Modifying the size of the biochar may form a uniform size of the biochar. Modifying the size of the biochar may include grinding the biochar utilizing a ball mill, though other grinding mechanisms may be utilized.

Some embodiments of method 500-*a* include producing the biochar. Producing the biochar may include: introducing a compound that includes at least carbon, oxygen, and hydrogen into a reaction chamber; heating the compound to a temperature of at least 1,000 degrees Celsius in the reaction chamber such that the compound reacts through a pyrolysis reaction to produce biochar; and/or collecting the produced biochar.

In some embodiments of method 500-*a*, the temperature is at least 1,100 degrees Celsius. In some embodiments, the compound has a residence time in the reaction chamber between 10 seconds and 1,000 seconds to produce the biochar. The compound may have a residence time in the reaction chamber of 300 seconds or less to produce the biochar. The compound may have a residence time in the reaction chamber of 120 seconds or less to produce the biochar. In some embodiments, the pyrolysis reaction includes a hydrous pyrolysis reaction.

In some embodiments of method 500-*a*, the biochar includes: a carbon component produced from at least biomass or a waste stream, wherein the carbon component includes at least graphite or graphene; a hydrogen component; and/or one or more mineral components originating from at least the biomass or the waste stream. The biochar may have a surface area of at least 300 m2/g. The biochar may have a surface area of at least 360 m2/g. The biochar may have a water holding capacity of at least 80% of a weight of the biochar. The biochar may have a fixed volatile content less than or equal to 2% of the biochar product. The biochar may have a pH between 10 and 11.

Some embodiments of method 500-*a* include modifying a size of the biochar before utilizing the biochar with respect to at least the polishing one or more objects utilizing biochar, cleaning one or more objects utilizing biochar, grinding one or more objects utilizing biochar, scratching one or more objects utilizing biochar, or abrading one or more objects utilizing biochar. Modifying the size of the biochar may result in a uniform size of the biochar.

Figure 5B:
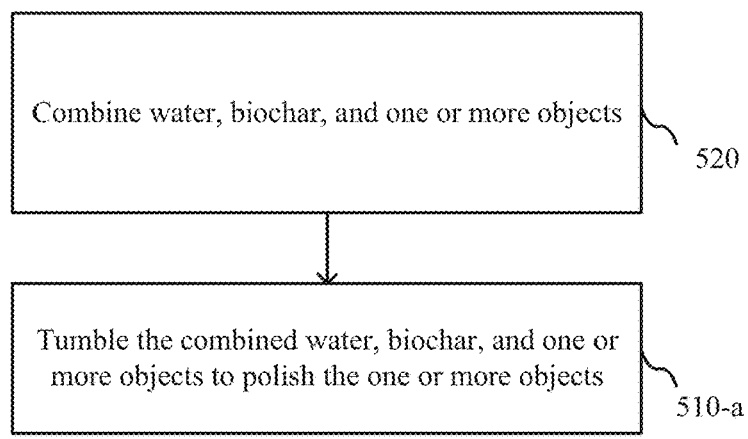
FIG. 5B shows a flowchart for a biochar method in accordance with various embodiments.

FIG. 5B provides an overview of a flowchart of a biochar method 500-*b* in accordance with various embodiments. Method 500-*b* may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 101 of FIG. 1F, system 101-*a* of FIG. 1G, system 101-*b* of FIG. 1I, system 200-*a* of FIG. 2A, and/or system 200-*b* of FIG. 2B, for example. In FIG. 5B, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants may be noted in the description that follows. Method 500-*b* may be an example of method 500-*a* of FIG. 5A.

At block 520, water, biochar, and one or more objects may be combined. At block 510-*a*, the combined water, biochar, and one or more objects may be tumbled to polish the one or more objects. The one or more objects may include one or more stones. The tumbling may occur for 72 hours or less. The tumbling may occur as a single step.

Figure 5C:
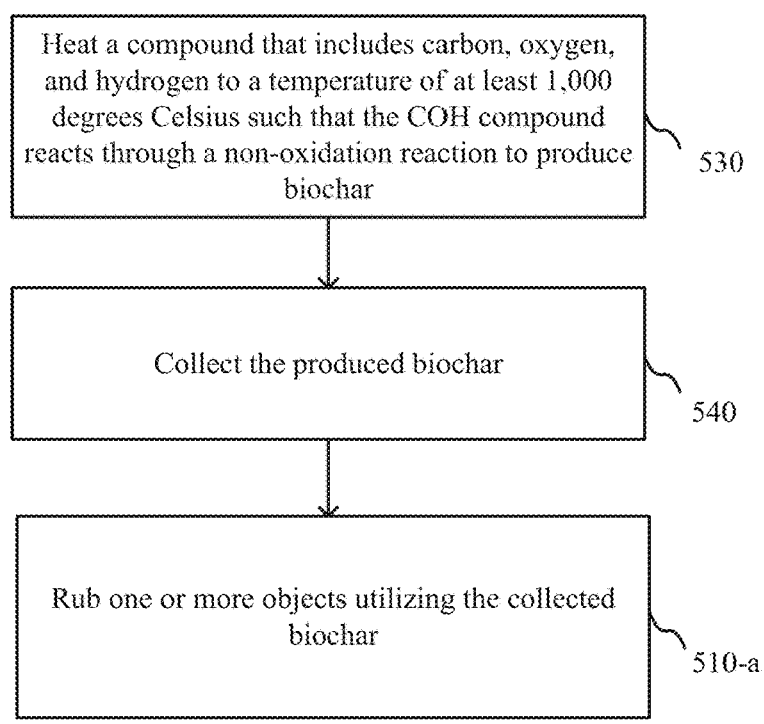
FIG. 5C shows a flowchart for a biochar method in accordance with various embodiments.

FIG. 5C provides an overview of a flowchart of a biochar method 500-*c* in accordance with various embodiments. Method 500-*c* may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 101 of FIG. 1F, system 101-*a* of FIG. 1G, system 101-*b* of FIG. 1I, system 200-*a* of FIG. 2A, and/or system 200-*b* of FIG. 2B, for example. In FIG. 5C, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants may be noted in the description that follows. Method 500-*c* may be an example of method 500-*a* of FIG. 5A.

At block 530, a compound that includes at least carbon, oxygen, and hydrogen (a COH compound) may be heated to a temperature of at least 1,000 degrees Celsius such that the COH compound reacts through a non-oxidation reaction to produce biochar. At block 540, the produced biochar may be collected. At block 510-*b*, the collected biochar may be utilized to rub with one or more objects, which may include, but is not limited to: polishing, grinding, scratching, and/or abrading the one or more objects.

Figure 6A:
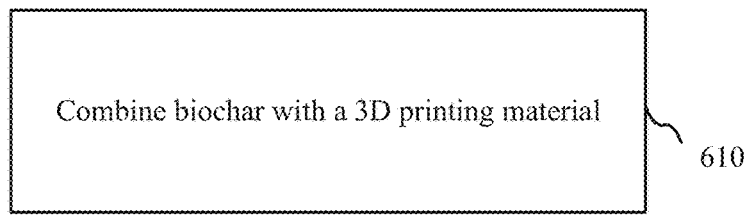
FIG. 6A shows a flowchart for a biochar method in accordance with various embodiments.

Turning now to FIG. 6A, a method 600-*a* in accordance with various embodiments is provided. Method 600-*a* may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 101-*c* of FIG. 1J, system 200-*a* of FIG. 2A, and/or system 200-*b* of FIG. 2B, for example. In FIG. 6A, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants may be noted in the description that follows.

At block 610, biochar may be combined with a 3D printing material. The 3D printing material may include plastic. The combined biochar and the 3D printing material may be formed into filaments in some cases and may then be utilized in a variety of different 3D printers. The combined biochar and 3D printing material may be utilized to make one or more 3D objects utilize a 3D printer. The use of biochar with 3D printing materials may provide for light weight, high strength materials, with high elastic modulus.

Figure 6B:
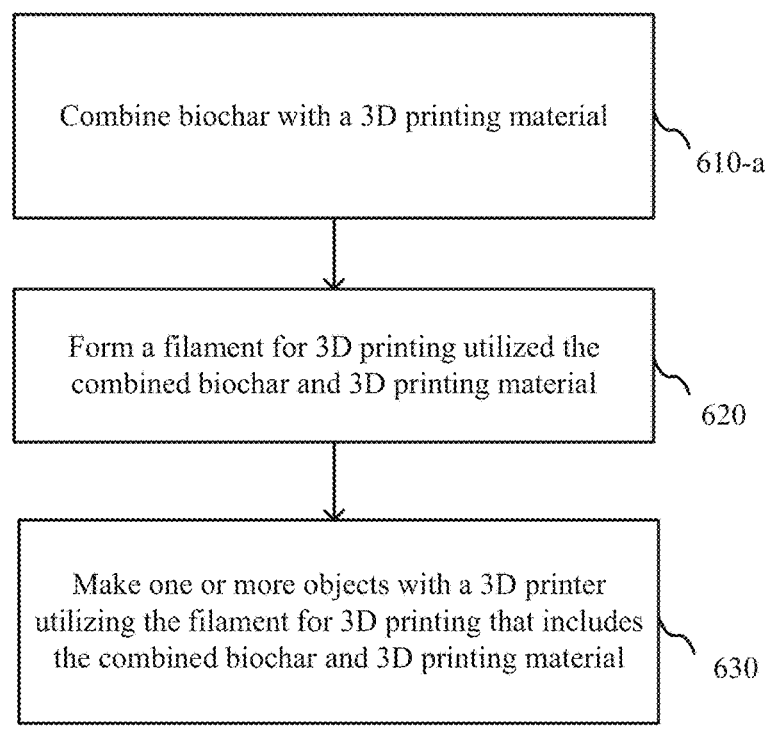
FIG. 6B shows a flowchart for a biochar method in accordance with various embodiments.

Turning now to FIG. 6B, a method 600-*b* in accordance with various embodiments is provided. Method 600-*b* may be implemented utilizing aspects of system 100-*a* of FIG. 1, system 100-*b* of FIG. 1B, system 100-*c* of FIG. 1C, system 100-*d* of FIG. 1D, system 100-*e* of FIG. 1E, system 101-*c* of FIG. 1J, system 200-*a* of FIG. 2A, and/or system 200-*b* of FIG. 2B, for example. In FIG. 6B, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants may be noted in the description that follows. Method 600-*b* may be an example of method 600-*a* of FIG. 6A.

At block 610-*a*, biochar may be combined with a 3D printing material. At block 620, a filament for 3D printing may be formed utilized the combined biochar and 3D printing material, which may include a plastic. At block 630, one or more objects may be made with a 3D printer utilizing the filament for 3D printing that includes the combined biochar and 3D printing material While detailed descriptions of one or more embodiments have been given above, various alternatives, modifications, and equivalents will be apparent to those skilled in the art without varying from the spirit of the different embodiments. Moreover, except where clearly inappropriate or otherwise expressly noted, it should be assumed that the features, devices, and/or components of different embodiments may be substituted and/or combined. Thus, the above description should not be taken as limiting the scope of the different embodiments, which may be defined by the appended claims.

What is claimed is:

1. A method comprising:
   polishing one or more rocks with biochar, wherein polishing the one or more rocks with the biochar includes:
      combining water, the biochar, and the one or more rocks;
      tumbling the combined water, biochar, and one or more rocks for a duration of between two days and five days; and
      separating the biochar from the one or more rocks after polishing the one or more rocks with the biochar.

2. The method of claim 1, wherein the tumbling occurs between two days and three days.

3. The method of claim 1, wherein the tumbling occurs as a single step.

4. The method of claim 1, wherein the biochar includes graphene.

5. The method of claim 1, wherein the biochar includes graphene-like characteristics.

6. The method of claim 1, wherein the biochar includes graphite.

* * * * *